United States Patent [19]

Masumoto et al.

[11] 3,837,933
[45] Sept. 24, 1974

[54] HEAT TREATED MAGNETIC MATERIAL

[75] Inventors: Hakaru Masumoto, Sendai; Yuetsu Murakami, Miyagi; Masakatsu Hinai, Natori, all of Japan

[73] Assignee: The Foundation: The Research Institute of Electric and Magnetic Alloys

[22] Filed: Mar. 7, 1972

[21] Appl. No.: 232,551

[30] Foreign Application Priority Data

| Mar. 13, 1971 | Japan | 46-13518 |
| May 19, 1971 | Japan | 46-33773 |
| June 10, 1971 | Japan | 46-40546 |

[52] U.S. Cl............. 148/31.55, 148/120, 148/121, 75/170, 75/171
[51] Int. Cl............................................ C04b 35/00
[58] Field of Search............ 148/121, 31.57, 31.55, 148/100, 101, 120, 111; 75/170, 171

[56] References Cited
UNITED STATES PATENTS

| 1,873,155 | 8/1932 | Scharnow | 148/31.55 |
| 1,910,309 | 5/1933 | Smith et al | 148/31.55 |
| 3,024,141 | 3/1962 | Burket et al | 148/120 |
| 3,347,718 | 10/1967 | Carpenter et al | 148/111 |
| 3,390,443 | 7/1968 | Gould et al | 148/31.55 |
| 3,698,055 | 10/1972 | Holtz et al | 75/170 |
| 3,723,106 | 3/1973 | Schlenker et al | 75/170 |

*Primary Examiner*—Walter R. Satterfield
*Attorney, Agent, or Firm*—Sughrue, Rothwell, Mion, Zinn & Macpeak

[57] ABSTRACT

Magnetic materials having high permeability such as initial permeability of 3,000 to 109,300 and maximum permeability of 5,000 to 461,000, high hardness of 150 to 359 high specific electric resistance, and excellent workability are produced by forming Ni-Fe-Nb alloy consisting of by weight 70 to 85.9 percent of Ni, 5 to 28 percent of Fe, 1 to 14 percent of Nb as main ingredients, and 0.01 to 10 percent of subingredients selected from the group consisting of by weight of 0 to 8 percent of Mo, 0 to 7 percent of Cr, 0 to 10 percent of W, 0 to 7 percent of V, 0 to 10 percent of Ta, 0 to 10 percent of Mn, 0 to 7 percent of Ge, 0 to 7 percent of Ti, 0 to 5 percent of Zr, 0 to 5 percent of Al, 0 to 5 percent of Si, 0 to 5 percent of Sn, 0 to 5 percent of Sb, 0 to 10 percent of Co and 0 to 10 percent of Cu and a small amount of impurities, the alloy being heated at a temperature more than 800°C in a non-oxidizing atmosphere or in vacuum for more than 1 minute to 100 hours corresponding to the composition and cooled to a room temperature from a temperature of more than the order-disorder transformation point of about 600°C at a suitable cooling speed of 100°C/second to 1°C/hour corresponding to the composition, whereby the degree of order is within 0.1 to 0.6 and a more excellent workability than Mo-Permalloy is obtained.

11 Claims, 30 Drawing Figures

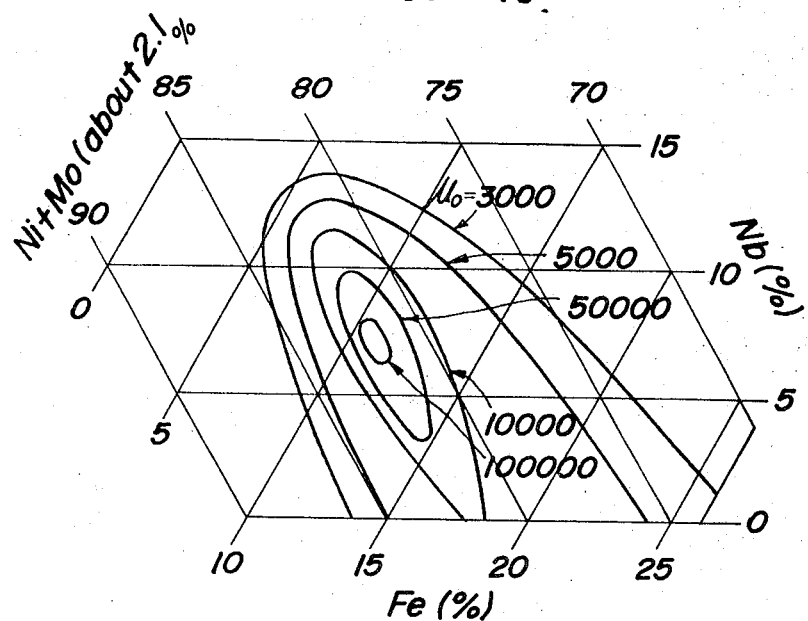
FIG. 1A Initial Permeability of Ni-Fe-Nb-Mo (about 2.1%) alloy
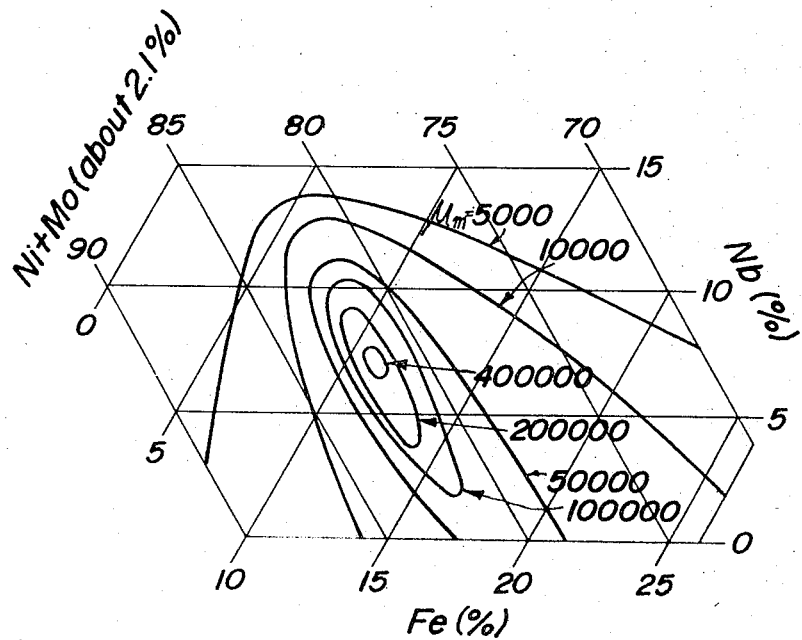
FIG. 1B Maximum Permeability Ni-Fe-Nb-Mo (about 2.1%) alloy

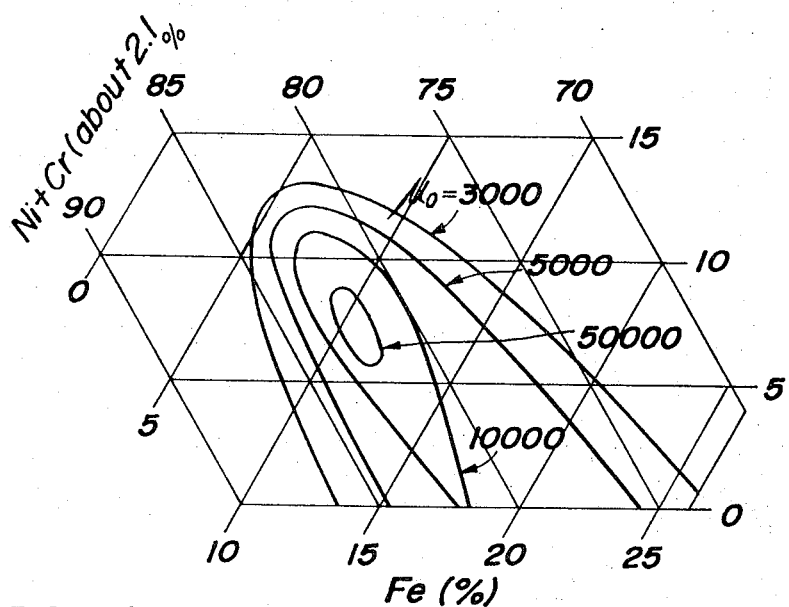
FIG.2A Initial Permeability of Ni-Fe-Nb-Cr (about 2.1%) alloy
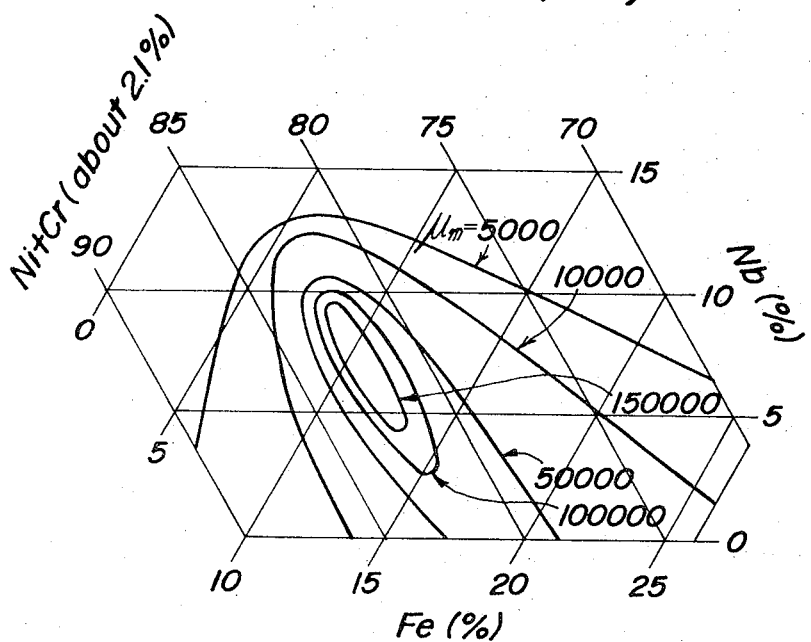
FIG.2B Maximum Permeability of Ni-Fe-Nb-Cr (about 2.1%) alloy

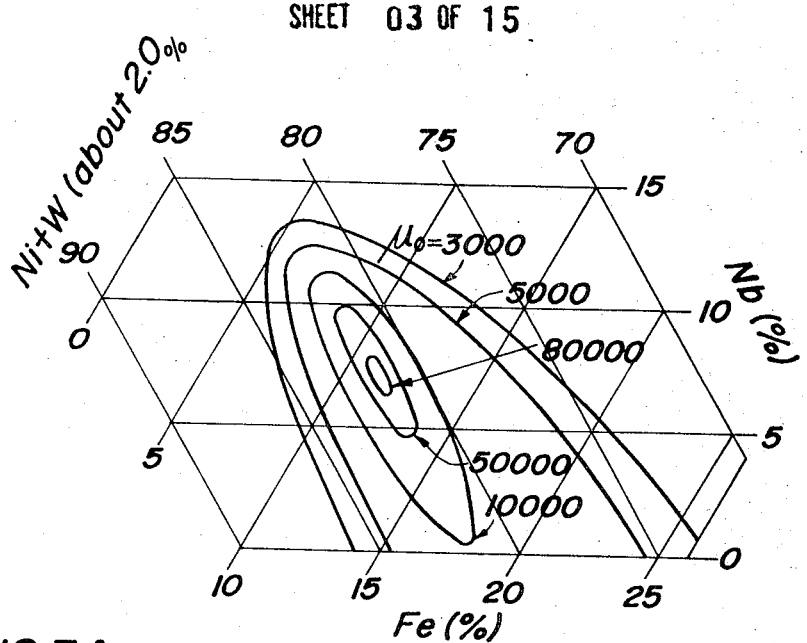
FIG.3A Initial Permeability of Ni-Fe-Nb-W (about 2.0%) alloy
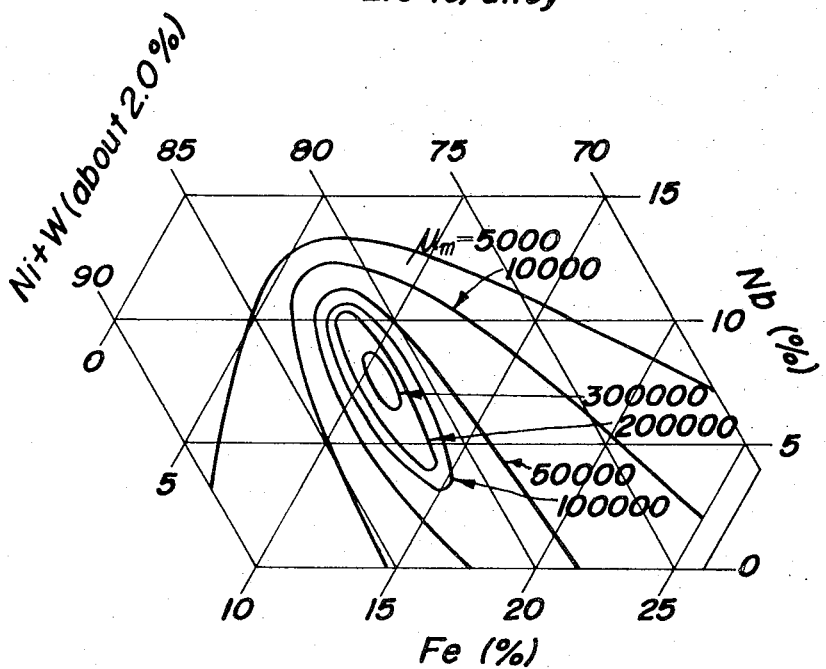
FIG.3B Maximum Permeability of Ni-Fe-Nb-W (about 2.0%) alloy

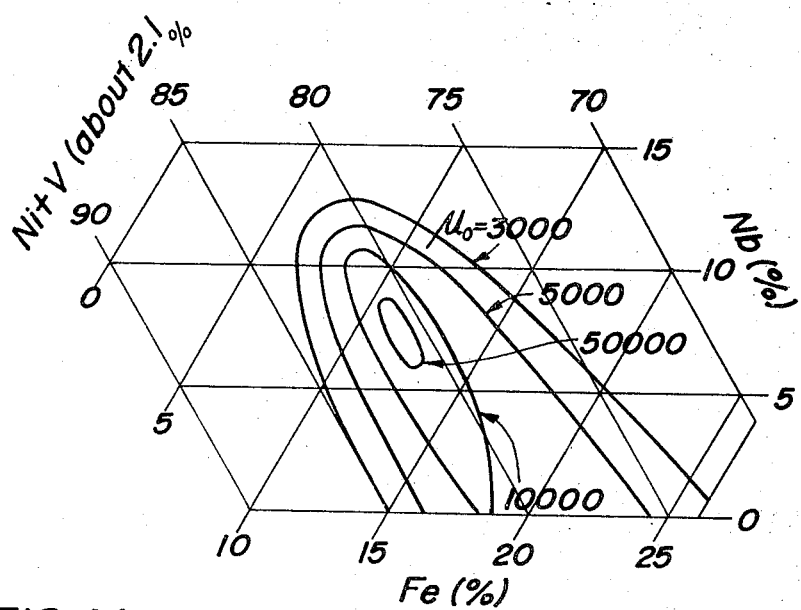
FIG.4A Initial Permeability of Ni-Fe-Nb-V (about 2.1%) alloy
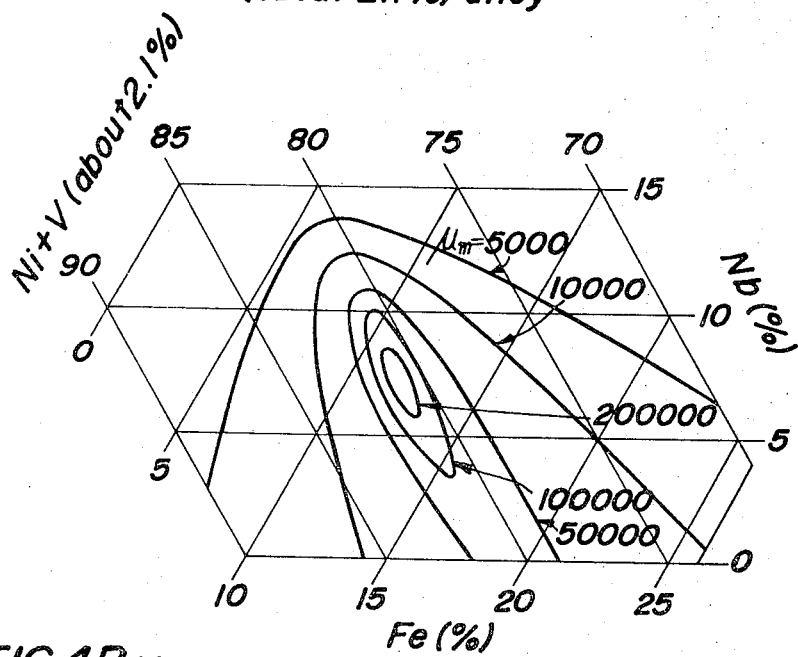
FIG.4B Maximum Permeability of Ni-Fe-Nb-V (about 2.1%) alloy

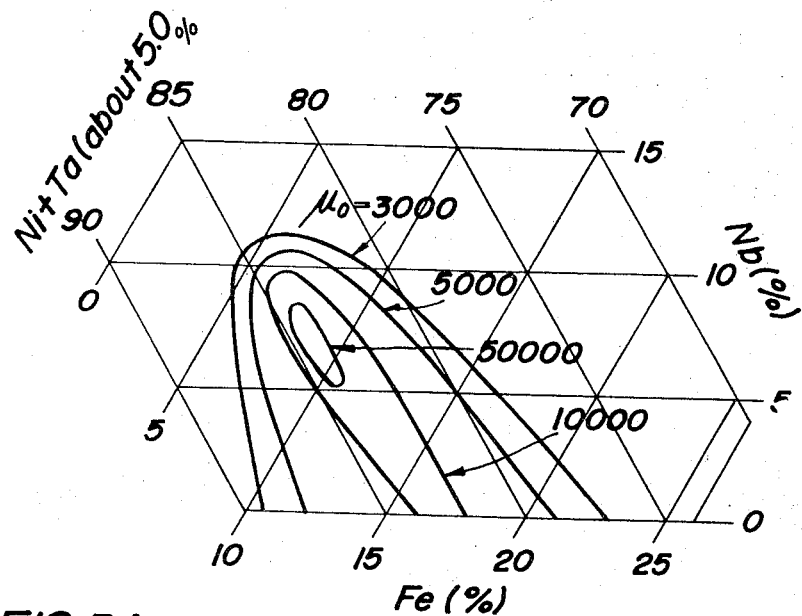
FIG.5A Initial Permeability of Ni-Fe-Nb-Ta (about 5.0%) alloy
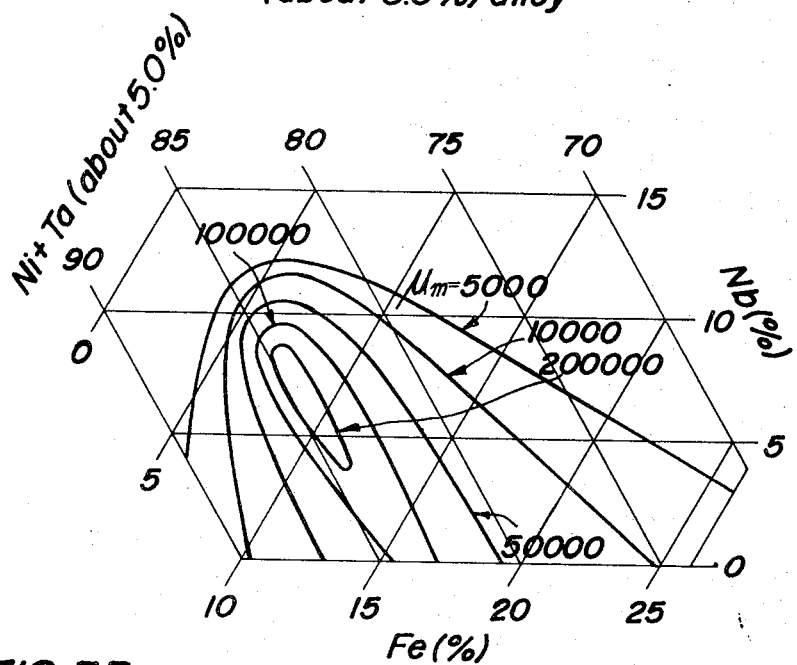
FIG.5B Maximum Permeability of Ni-Fe-Nb-Ta (about 5.0%) alloy

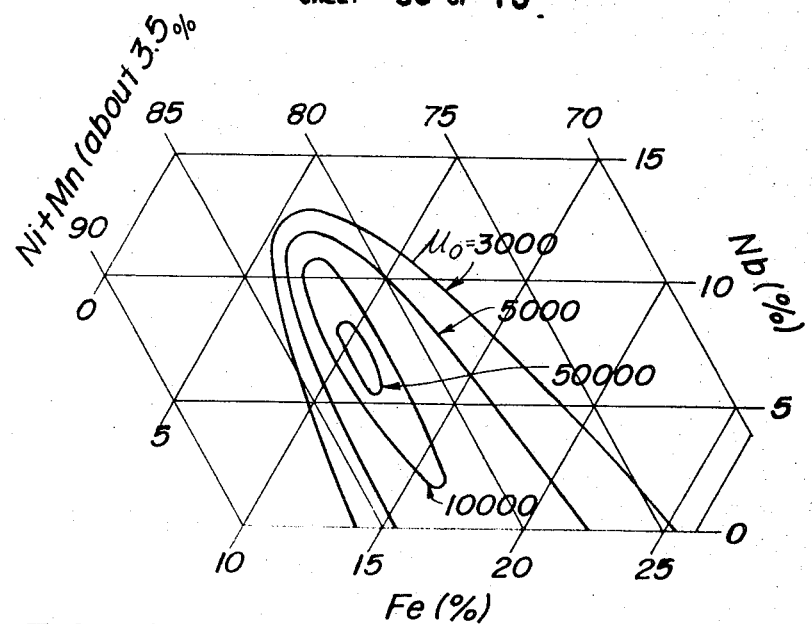
FIG. 6A Initial Permeability of Ni-Fe-Nb-Mn (about 3.5%) alloy
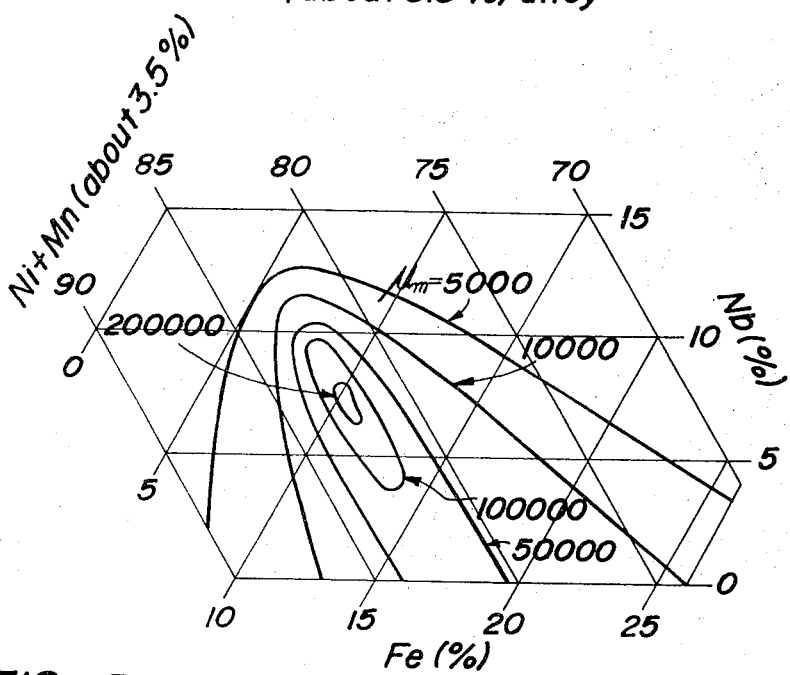
FIG. 6B Maximum Permeability of Ni-Fe-Nb-Mn (about 3.5%) alloy

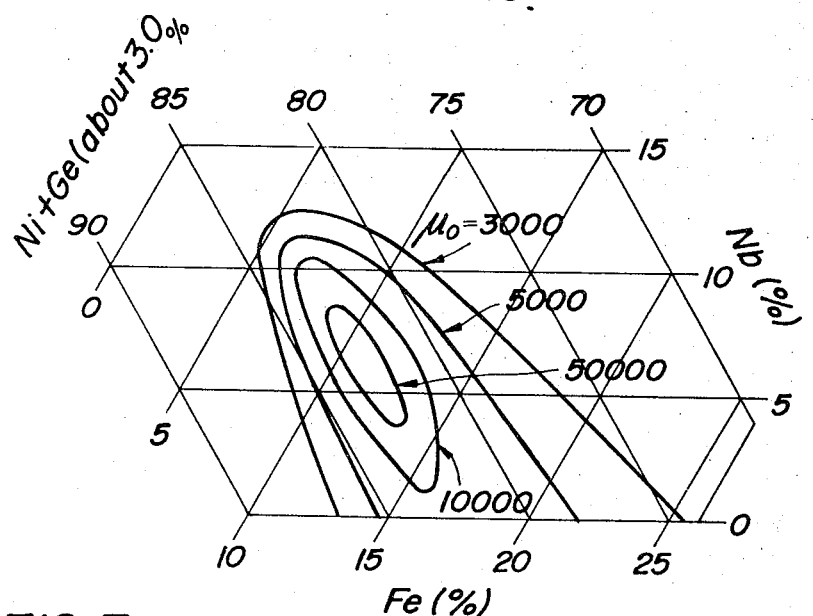
FIG.7A Initial Permeability of Ni-Fe-Nb-Ge (about 3.0 %) alloy
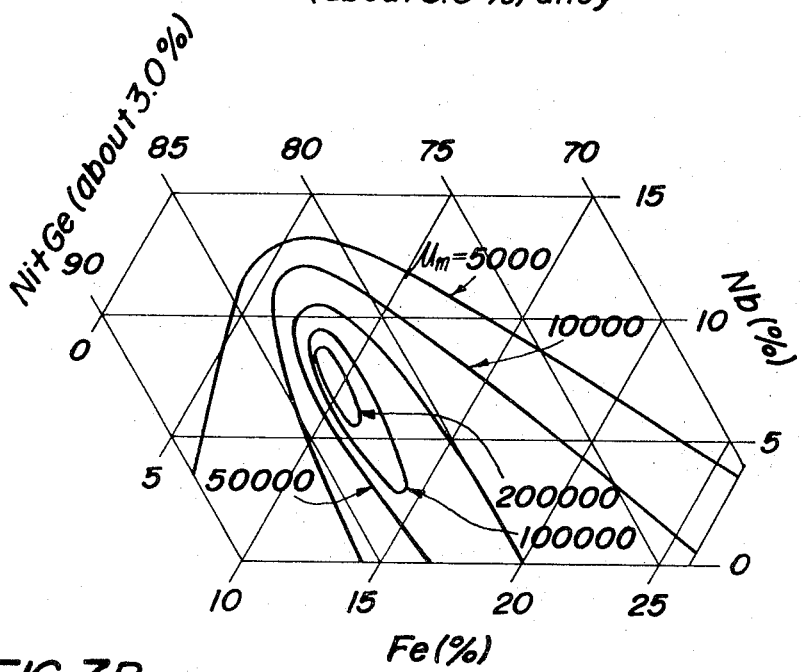
FIG.7B Maximum Permeability of Ni-Fe-Nb-Ge (about 3.0 %) alloy

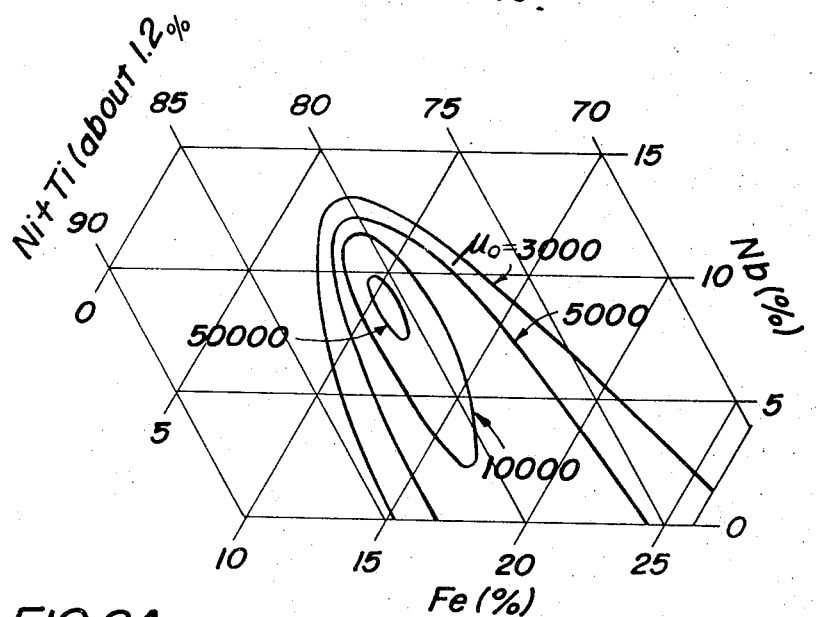
FIG.8A Initial Permeability of Ni-Fe-Nb-Ti (about 1.2%) alloy
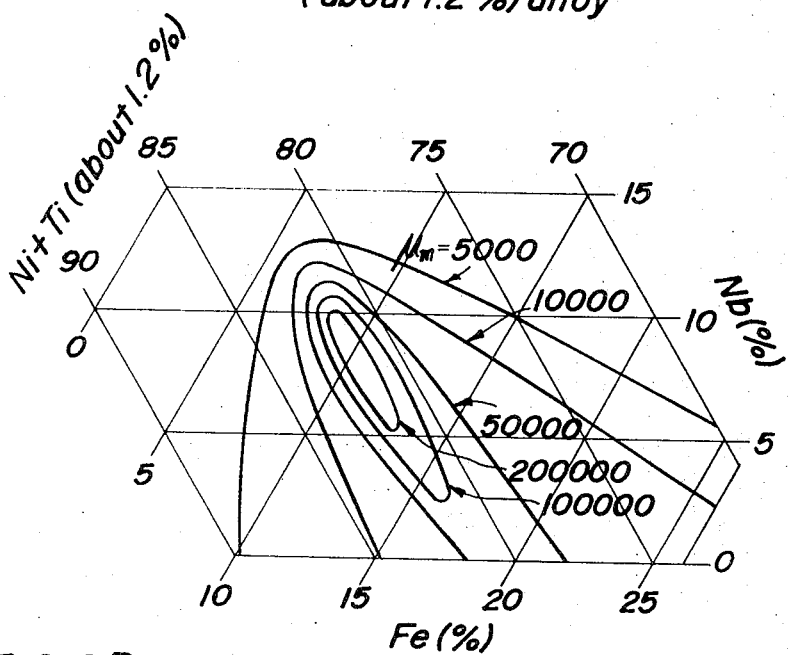
FIG.8B Maximum Permeability of Ni-Fe-Nb-Ti (about 1.2%) alloy

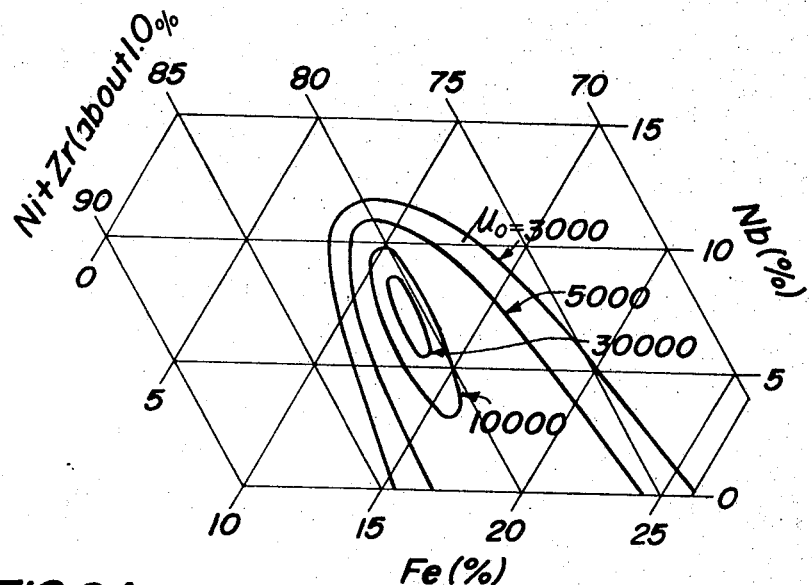
FIG.9A Initial Permeability of Ni-Fe-Nb-Zr (about 1.0%) alloy
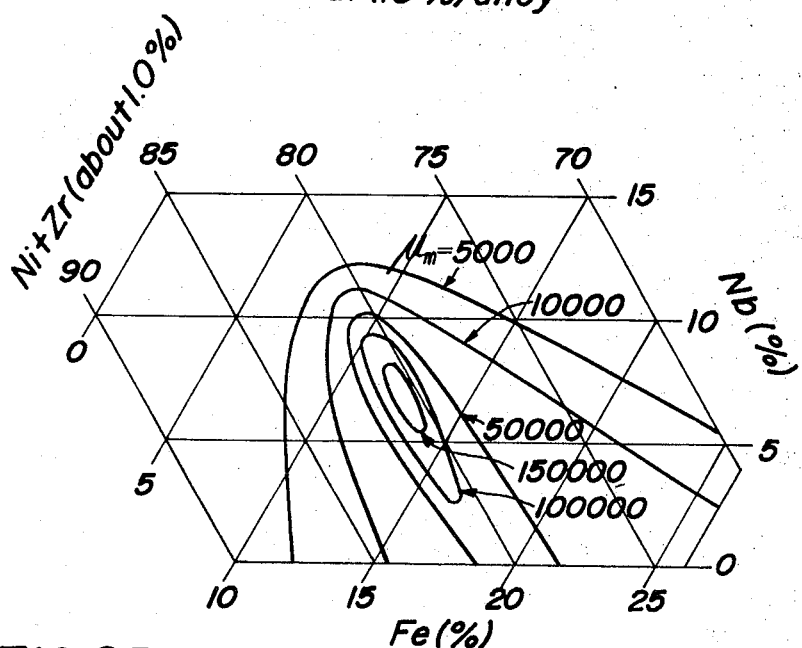
FIG.9B Maximum Permeability of Ni-Fe-Nb-Zr (about 1.0%) alloy

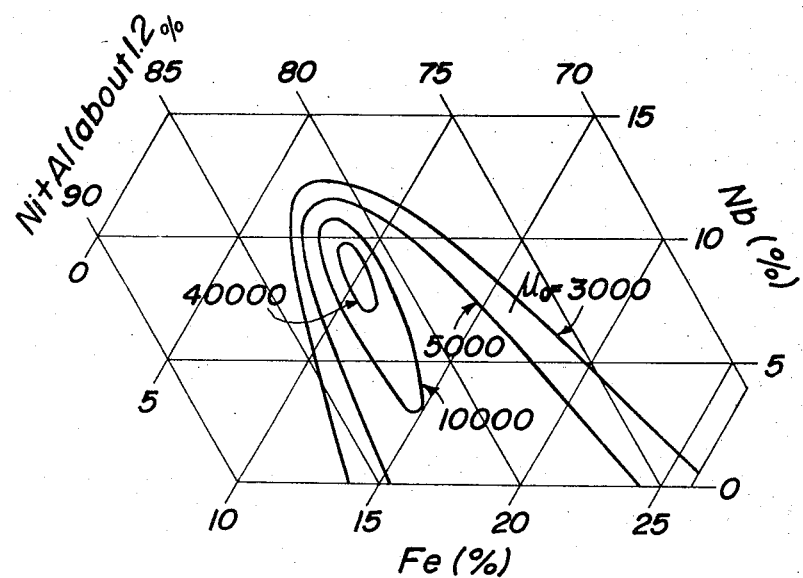
*FIG.10A* Initial Permeability of Ni-Fe-Nb-Al (about 1.2%) alloy
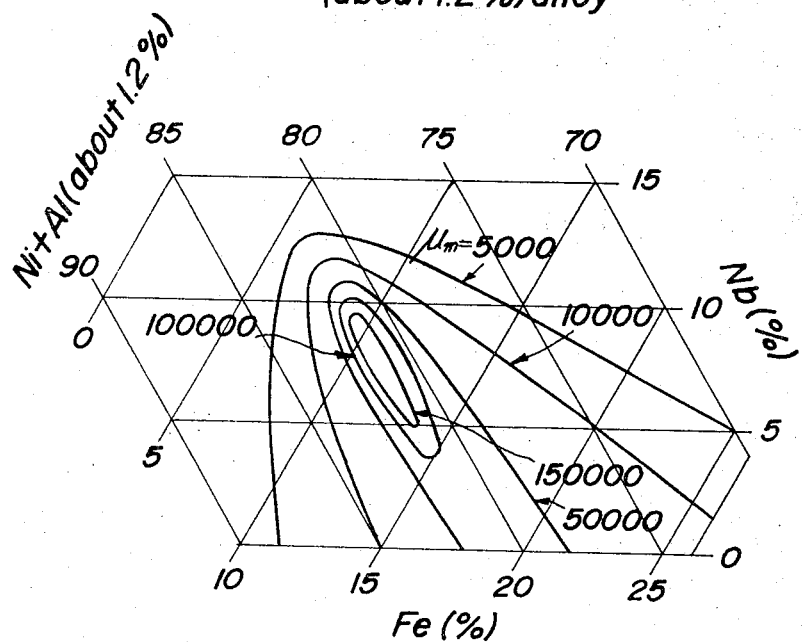
*FIG.10B* Maximum Permeability of Ni-Fe-Nb-Al (about 1.2%) alloy

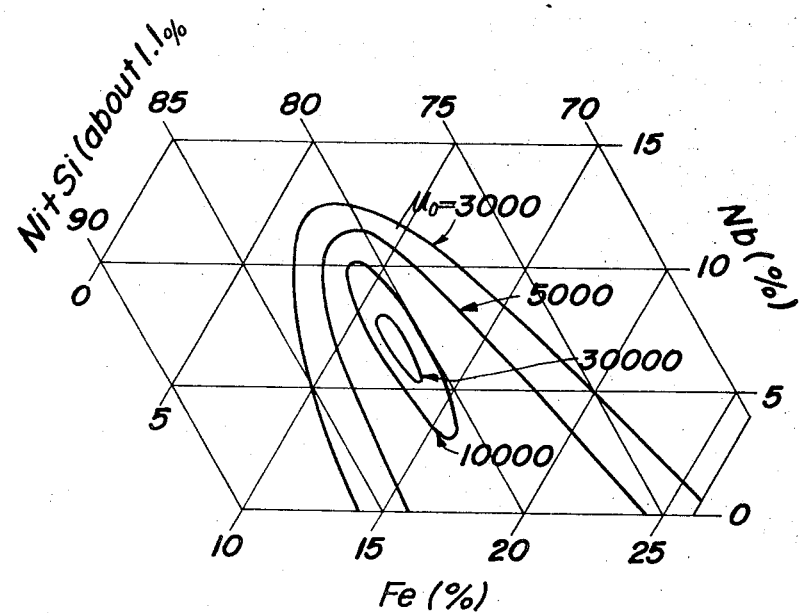
FIG.11A Initial Permeability of Ni-Fe-Nb-Si (about 1.1%) alloy
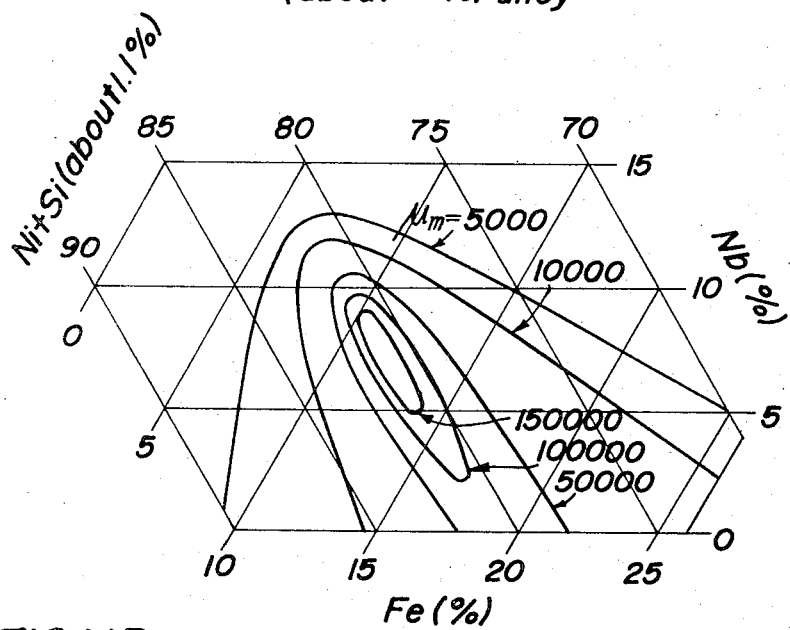
FIG.11B Maximum Permeability of Ni-Fe-Nb-Si (about 1.1%) alloy

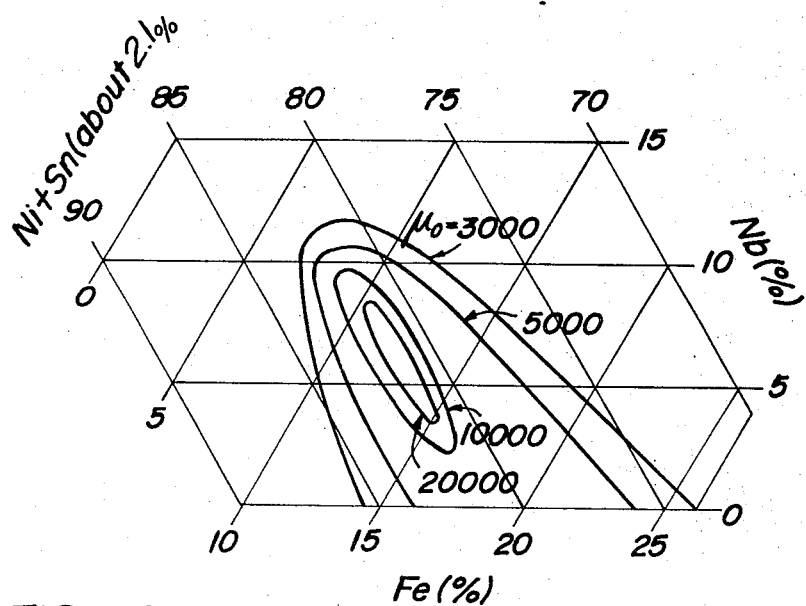
FIG. 12A Initial Permeability of Ni-Fe-Nb-Sn (about 2.1%) alloy
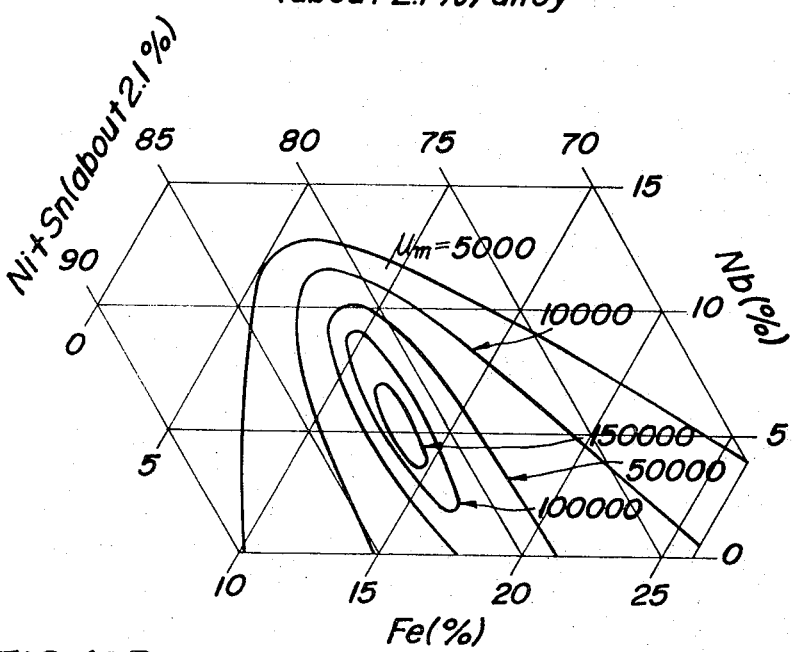
FIG. 12B Maximum Permeability of Ni-Fe-Nb-Sn (about 2.1%) alloy

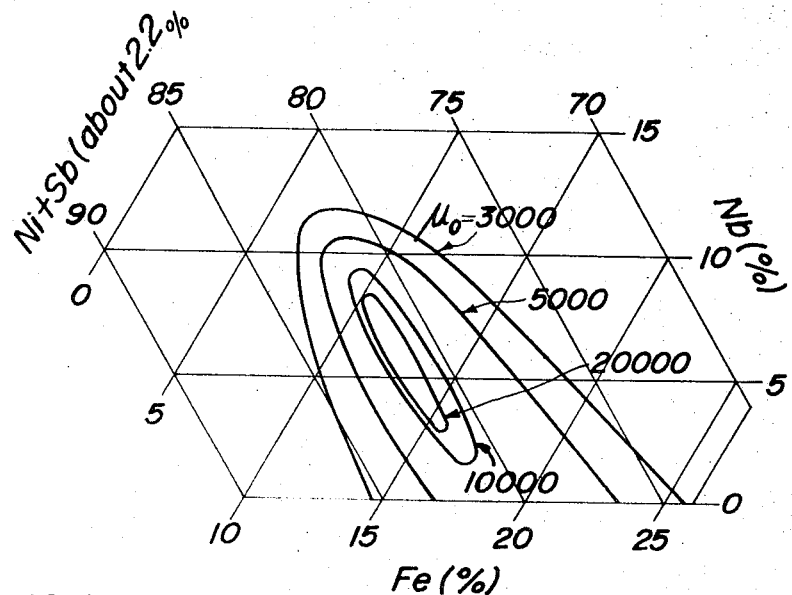
FIG.13A Initial Permeability of Ni-Fe-Nb-Sb (about 2.2%) alloy
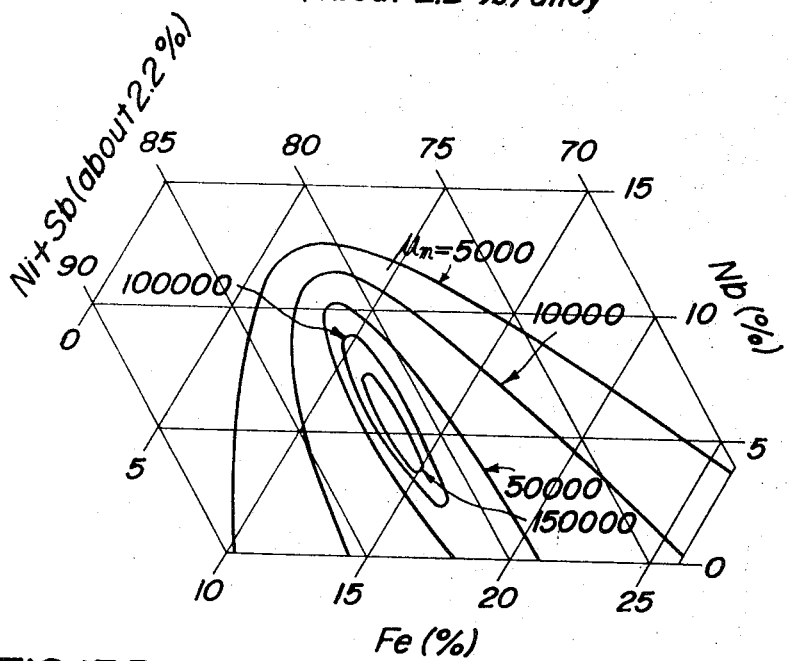
FIG.13B Maximum Permeability of Ni-Fe-Nb-Sb (about 2.2%) alloy

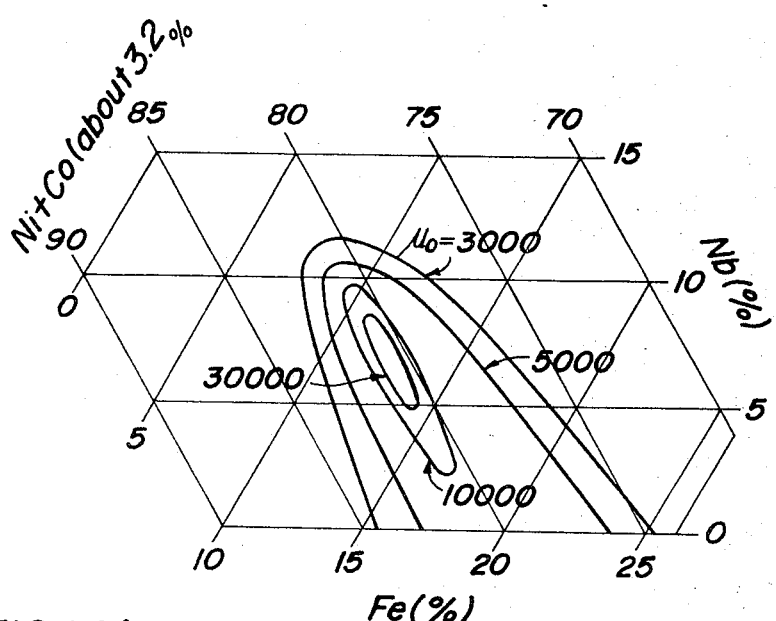
FIG.14A Initial Permeability of Ni-Fe-Nb-Co (about 3.2%) alloy
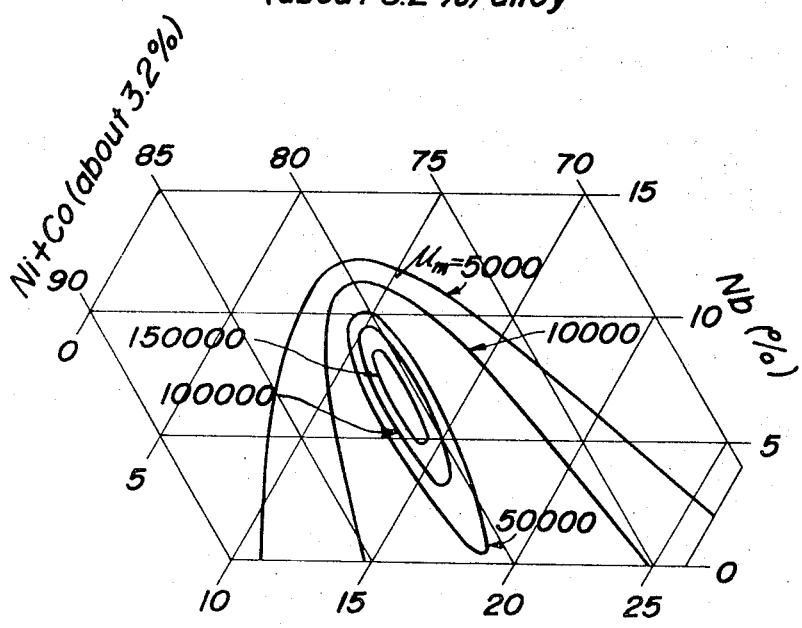
FIG.14B Maximum Permeability of Ni-Fe-Nb-Co (about 3.2%) alloy

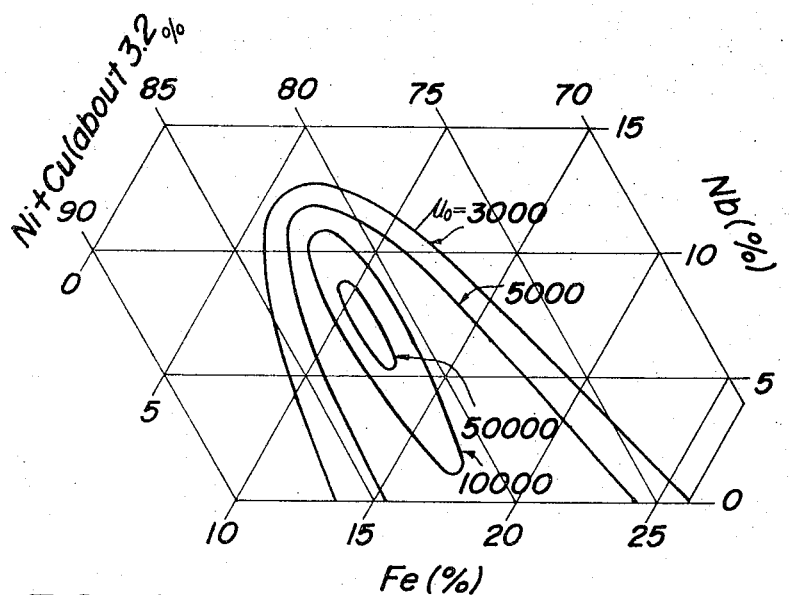
FIG.15A Initial Permeability of Ni-Fe-Nb-Cu (about 3.2%) alloy
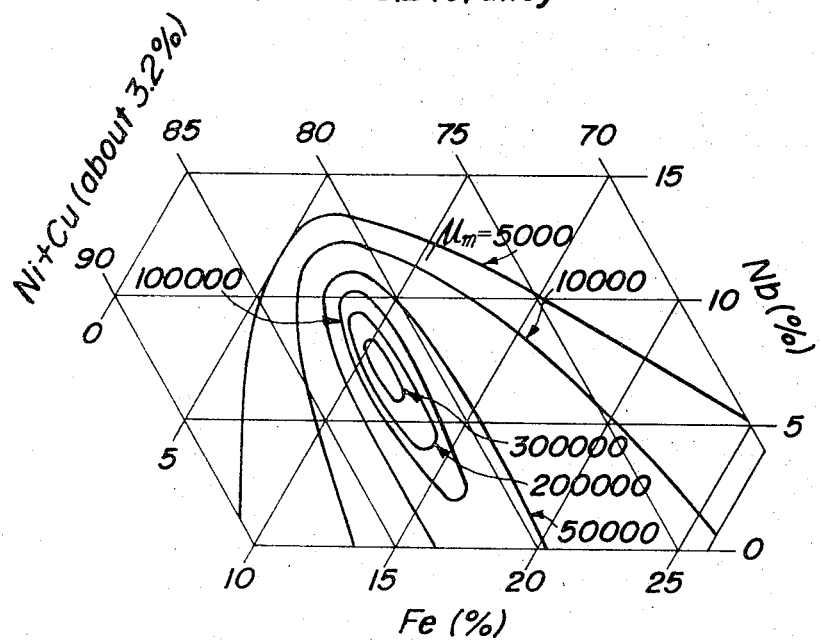
FIG.15B Maximum Permeability of Ni-Fe-Nb-Cu (about 3.2%) alloy

HEAT TREATED MAGNETIC MATERIAL

This invention relates to magnetic materials consisting essentially of Ni-Fe-Nb series alloy and having high permeability, high specific electric resistance, high hardness and excellent forgeability and workability, more particularly, to produce a magnetic material consisting essentially of Ni-Fe-Nb series alloy containing 70–85.9 percent of Ni, 5–28 percent of Fe and 1–14 percent, preferably 3.1–14 percent of Nb, as main ingredients and less than 10 percent of total amount of subingredients selected from the group consisting of 0–8 percent of Mo, 0–7 percent of Cr, 0–10 percent of W, 0–7 percent of V, 0–10 percent of Ta, 0–10 percent of Mn, 0–7 percent of Ge, 0–7 percent of Ti, 0–5 percent of Zr, 0–5 percent of Al, 0–5 percent of Si, 0–5 percent of Sn, 0–5 percent of Sb, 0–10 percent of Co and 0–10 percent of Cu, and a small amount of impurity.

The principal object of the invention is to provide magnetic material having high permeability, high specific electric resistance, high hardness, and further excellent forgeability and workability, so as to provide a magnetic alloy for the use of magnetic recording and reproducing head having excellent magnetic property.

Nowadays, as a magnetic material of audio magnetic recording and reproducing heads, Permalloy (Ni-Fe series alloy) having high permeability and high workability is generally used, but its hardness is about 130 of low value of Vickers hardness Hv and its anti-abrasive property is very low, accordingly, it is an important problem to improve such anti-abrasive property and hardness.

The present inventors have studies an alloy having higher permeability than Permalloy series binary alloy, and having high hardness, high specific electric resistance, high forgeability and high workability. After various investigations on the alloys which are more easily forged and rolled than in case of Permalloys at a high temperature and even at a room temperature, the inventors have found that the Ni-Fe series alloy adding 1–14 percent of Nb can attain this object.

Further, the inventors have made investigations and experiments of the Ni-Fe-Nb alloy by adding to them less than 10 percent in total of one or more than one of Mo, Cr, W, V, Ta, Mn, Ge, Ti, Zr, Al, Si, Sn, Sb, Co and Cu, and finally found alloys having superior magnetic properties of high permeability, high hardness, high specific electric resistance, high forgeability and high workability.

An object of the invention is to provide Ni-Fe-Nb series alloy containing by weight 70–85.9 percent of Ni, 5–28 percent of Fe and 1–14 percent, preferably 3.1–14 percent of Nb as a main ingredient, and by weight 0.01–10 percent in total amount of subingredient selected from the group consisting of 0–8 percent of Mo, 0–7 percent of Cr, 0–10 percent of W, 0–10 percent of V, 0–10 percent of Ta, 0–10 percent of Mn, 0–7 percent of Ge, 0–7 percent of Ti, 0–5 percent of Zr, 0–5 percent of Al, 0–5 percent of Si, 0–5 percent of Sn, 0–5 percent of Sb, 0–10 percent of Co and 0–10 percent of Cu and a small amount of impurity and having high permeability, high hardness, large specific electric resistance and high forgeability and high workability, such as high initial permeability of more than 3,000 and maximum permeability of more than 5,000 and Vickers hardness of more than 150, so as to provide a high permeability magnetic alloy which is available to magnetic recording and reproducing head by simple heat treatment.

A preferable range of the composition in the present invention is as follows. That is, it is most preferable to use the alloy consisting of 75–83 percent of Ni, 8–23 percent of Fe and 6–10 percent of Nb as a main ingredient and 0.01–10 percent by weight in total of one or more than one of 0–4 percent of Mo, 0–3 percent of Cr, 0–5 percent of W, 0–4 percent of V, 0–7 percent of Ta, 0–5 percent of Mn, 0–5 percent of Ge, 0–3 percent of Ti, 0–3 percent of Zr, 0–3 percent of Al, 0–3 percent of Si, 0–3 percent of Sn, 0–3 percent of Sb, 0–5 percent of Co and 0–5 percent of Cu, and a small amount of impurity.

Further, the alloy having the above composition is heated at a high temperature of more than 800°C, preferably more than 1,100°C and lower than a melting point, in a nonoxidizing atmosphere or vacuum for at least more than 1 minute and less than about 100 hours corresponding to the composition, sufficiently heated at a high temperature so as to homogenize the structure thereof, removed from a strain caused by working, thereafter cooled to a temperature close to the order-disorder transformation point of about 600°C, maintained at the same temperature for a short time to make every portion of the structure a uniform temperature, then cooled to a room temperature at a suitable speed of 100°C/second to 1°C/hour corresponding to the composition, or further heated at a temperature of above 200°C and less than the order-disorder transformation point for more than 1 minute and less than about 100 hours corresponding to the composition and cooled, so as to obtain the magnetic alloy having high permeability and high hardness. In case, the order-disorder transformation point being defined as about 600°C to 800°C is due to the fact that the order-disorder transformation point is transferred by the change of an alloy composition. to The reasons why of heating temperature for homogenizing the alloy and removing the strain caused by working is limited to a temperature higher than 800°C, preferably higher than 1,100°C are due to the fact that even though any heating temperatures higher than a recrystallization temperature (about 600°C) can improve a magnetic property of the alloy, the heating temperature higher than 800°C, preferably higher than 1,100°C can significantly improve the magnetic property of the alloy.

The above range from the heating temperature to a temperature more than the order-disorder transformation point of but in the 600°C does not influence on magnetic property of the thus obtained alloy even by quenching or slow cooling, but the cooling speed at a temperature of less than the transformation point has a great influence upon the magnetic property, i.e., if the cooling is carried out from a temperature of more than the transformation point to a room temperature at a suitable speed of 100°C/second to 1°C/hour corresponding to the composition, the degree of order usually becomes about 0.1–0.6 and the excellent magnetic property can be obtained. Particularly, in case of 0.2–0.5 of the degree of order, the magnetic property is further improved. When the cooling is carried out at a speed close to 100°C/second among the above described cooling speeds, the degree of order becomes about 0.1, and if the cooling speed is elevated more than 100°C/second, the degree of the order does not proceed anymore but becomes smaller and the magnetic property is deteriorated. However, the alloy having such a small degree of order is reheated at a temperature of less than the transformation point of 200°–600°C, the degree of order proceeds to 0.1–0.6 and the magnetic property is improved.

On the other hand, if the cooling is slowly carried out from a temperature of more than the above transformation point at a speed of 1°C/hour, the degree of order is proceeded too fast to about 0.6 and the magnetic property is lowered.

In short, in the alloy having the composition according to the present invention, the excellent magnetic property can be obtained by heating for a sufficient time at more than 800°C, preferably 1,100°C and less than the melting point, cooling at a suitable speed, and regulating the degree of order between 0.1–0.6, preferably 0.2–0.5. If the cooling is too fast and the degree of order becomes too small, the alloy is reheated at a temperature of less than the order-disorder transformation point between 200°–600°C for adjusting the degree of order, and the magnetic property is remarkably improved.

Generally speaking, if the temperature of a heat treatment is high, it is necessary to shorten the time of the heat treatment, and if the temperature of a heat treatment is low, the time of the heat treatment should be lengthened. Further, in case of a voluminous alloy, the time of the heat treatment is lengthened and in case of a small volume of alloy, the time of the heat treatment is shortened, as a matter of course.

Further, the cooling speed from about 600°C to a room temperature in order to obtain the highest permeability of each alloy according to the present invention is fairly different in accordance with the composition of each alloy, but the speed about the cooling in a furnace, i.e., slow cooling, is advantageous in practical application. For instance, in case of manufacturing a magnetic recording and reproducing head, the heat treatment for removing strains produced after forming or working is preferably carried out in a non-oxidizing atmosphere or vacuum in order to maintain the configuration of a product and to avoid any formation of oxide on the surface thereof, so that the alloy according to the present invention, which exhibits the excellent characteristic features by slow cooling, is suitable for such heat treatment.

The process for the production of the alloy according to the present invention will be explained in detail in order.

At first, in order to prepare the alloy according to the present invention, a definite amount by weight of 70–85.9 percent of Ni, 5–28 percent of Fe and 1–14 percent, preferably 3.1–14 percent of Nb or ferro-niobium available on the market instead of metallic niobium as a main ingredient are melted in air, preferably in a non-oxidizing atmosphere or in vacuum, with the use of a suitable melting furnace, thereto added manganese, silicon, aluminum, titanium, boron, calcium alloys, magnesium alloys and a small amount of other deoxidizing agent such as less than 1 percent and desulfurizing agent so as to remove impurity as far as possible, and further added a definite amount of less than 10 percent by weight in total of one or more than one of 0–8 percent of Mo, 0–7 percent of Cr, 0–10 percent of W, 0–7 percent of V, 0–10 percent of Ta, 0–10 percent of Mn, 0–7 percent of Ge, 0–7 percent of Ti, 0–5 percent of Zr, 0–5 percent of Al, 0–5 percent of Si, 0–5 percent of Sn, 0–5 percent of Sb, 0–10 percent of Co and 0–10 percent of Cu, all the substances thus added are sufficiently stirred to provide a molten alloy having homogeneous solid solution.

Next, the thus obtained molten alloy is poured into a mold having a desired shape and size to provide a sound ingot. This ingot is further applied to a forming processing such as forging or rolling at a room temperature or a high temperature, to make an article of a desired shape, for instance, a thin sheet of 0.3 mm thickness.

From the above thin plate, an annular sheet of outer diameter of 44 mm and inner diameter of 36 mm was punched, and the thus punched annular sheet was heated in hydrogen or other suitable non-oxidizing atmosphere or in vacuum at a temperature of more than 800°C, preferably more than 1,100°C and less than the melting point, for more than 1 minute and less than about 100 hours, and cooled at a suitable speed such as 100°C/second to 1°C/hour, preferably 10°C/second to 10°C/hour corresponding to the composition. Corresponding to the composition of the alloy, the sheet is further heated at a temperature of less than 600°C such as less than the order-disorder transformation point, preferably 200°–600°C selected from the condition corresponding to the composition of the alloy for more than 1 minute and less than about 100 hours and cooled so as to produce ferro-magnetic properties. It is necessary to suitably select the cooling speed most suitable for obtaining a superior magnetic properties according to the different composition of the alloy.

The permeability of the thus obtained annular sheet is measured by an ordinary Ballistic Galvanometer, and it was ascertained that it has very excellent magnetic properties such as the highest value of initial permeability ($\mu_o$) of 109,300 and maximum permeability ($\mu_m$) of 461,000. Further, the alloy according to the present invention has shown an excellent hardness and high specific electric resistance.

For a better understanding of the present invention, reference is made of the accompanying drawings, in which:

FIGS. 1–A and 1–B represent a characteristic diagram, illustrating the relative change between the maximum values of initial permeability and maximum permeability and the concentration of Ni-Fe-Nb-Mo alloy containing a definite amount of about 2.1 percent of Mo, obtained by several heat treatments, respectively;

FIGS. 2–A and 2–B represent a characteristic diagram, illustrating the relative change between the maximum values of initial permeability and maximum permeability and the concentration of Ni-Fe-Nb-Cr alloy containing a definite amount of about 2.1 percent of Cr, obtained by several heat treatment, respectively;

FIGS. 3–A and 3–B represent a characteristic diagram, illustrating the relative change between the maximum values of initial permeability and maximum permeability and the concentration of alloy of Ni-Fe-Nb-W alloy containing a definite amount about 2 percent of W, obtained by several heat treatments, respectively;

FIGS. 4–A and 4–B represent a characteristic diagram, illustrating the relative change between the maximum values of initial permeability and maximum permeability and the concentration of alloy of Ni-Fe-Nb-V alloy containing a definite amount of about 2.1 percent of V, obtained by several heat treatments, respectively;

FIGS. 5-A and 5-B represent a characteristic diagram, illustrating the relative change between the maximum values of initial permeability and maximum permeability and the concentration of alloy of Ni-Fe-Nb-Ta alloy containing a definite amount of 5 percent of Ta, obtained by several heat treatments, respectively;

FIGS. 6-A and 6-B represent a characteristic diagram, illustrating the relative change between the maximum values of initial permeability and maximum permeability and the concentration of alloy of Ni-Fe-Nb-Mn alloy containing a definite amount of 3.5 percent of Mn, obtained by several heat treatment, respectively;

FIGS. 7-A and 7-B represent a characteristic diagram, illustrating the relative change between the maximum values of initial permeability and maximum permeability and the concentration of alloy of Ni-Fe-Nb-Ge alloy containing 3 percent of Ge, obtained by several heat treatments, respectively;

FIGS. 8-A and 8-B represent a characteristic diagram, illustrating the relative change between the maximum values of initial permeability and maximum permeability and the concentration of alloy of Ni-Fe-Nb-Ti alloy containing about 1.2 percent of Ti, obtained by several heat treatments, respectively;

FIGS. 9-A and 9-B represent a characteristic diagram, illustrating the relative change between the maximum values of initial permeability and maximum permeability and the concentration of Ni-Fe-Nb-Zr alloy containing 1 percent of Zr, obtained by several heat treatments, respectively;

FIGS. 10-A and 10-B represent a characteristic diagram, illustrating the relative change between the maximum values of initial permeability and maximum permeability and the concentration of Ni-Fe-Nb-Al alloy containing about 1.2 percent of Al, obtained by several heat treatments, respectively;

FIGS. 11-A and 11-B represent a characteristic diagram, illustrating the relative change of the maximum values of initial permeability and maximum permeability and the concentration of Ni-Fe-Nb-Si alloy containing a definite amount of about 1.1 percent of Si, obtained by several heat treatments, respectively;

FIGS. 12-A and 12-B represent a characteristic diagram, illustrating the relative change between the maximum values of initial permeability and maximum permeability and the concentration of Ni-Fe-Nb-Sn alloy containing a definite amount of about 2.1 percent of Sn, obtained by several heat treatments, respectively;

FIGS. 13-A and 13-B represent a characteristic diagram, illustrating the relative change between the maximum values of initial permeability and maximum permeability and the concentration of Ni-Fe-Nb-Sb alloy containing a definite amount of about 2.2 percent of Sb, obtained by several heat treatments, respectively;

FIGS. 14-A and 14-B represent a characteristic diagram, illustrating the relative change between the maximum values of initial permeability and maximum permeability and the concentration of Ni-Fe-Nb-Co alloy containing a definite amount of about 3.2 percent of Co, obtained by several heat treatments, respectively;

FIGS. 15-A and 15-B represent a characteristic diagram, illustrating the relative change between the maximum values of initial permeability and maximum permeability and the concentration of Ni-Fe-Nb-Cu alloy containing a definite amount of about 3.2 percent of Co, obtained by several heat treatments, respectively;

For a better understanding of the present invention reference is made of the following embodiments.

EXAMPLE 1

The following test was made for alloy No. 31 including 80 percent of Ni, 10.9 percent of Fe, 7 percent of Nb and 2.1 percent of Mo in Table 6.

As a starting material, 99.8 percent of pure electrolytic nickel, 99.9 percent of pure electrolytic iron, 99.8 percent of pure niobium, and 99.9 percent of pure molybdenum were used. At the outset for preparing the starting material, pure nickel from 800 g of total amount of charge were charged into an alumina crucible and melted in a high frequency induction electric furnace in vacuum. Said amount of Nb, Fe and Mo were charged at said rate of the composition and stirred and mixed with each other so as to obtain a homogeneous molten alloy. The thus obtained melt was poured into an iron mold having a hole of 25 mm diameter and 170 mm height. The resulted article was intermediately twice sintered at a temperature of about 1,000°C and forged to a plate of about 7 mm thick and hot-rolled to a place of about 1 mm thick at a temperature of about 600°–900°C, cold rolled at a room temperature to a thin plate of about 0.3 mm, and punched out a ring plate having 44 mm in outer diameter and 36 mm in inner diameter.

The characteristic features as shown in Table 1 were obtained by applying several heat treatments.

Table 1

| Heat treatment | Initial permeability ($\mu_o$) | Maximum permeability ($\mu_m$) | Residual magnetic flux density (G) | Coercive force (Oe) | Hysteresis loss (erg/cm³/cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., cooled to 600°C in furnace and further cooled to room temperature at speed of 240°C/hr. | 29,950 | 162,800 | 2,470 | 0.0105 | 14.68 | 5,630 | 83.8 | 210 |
| After said heat treatment, further heated in vacuum at 400°C for 5 hrs. | 48,000 | 218,400 | – | – | – | – | – | – |

Table 1—Continued

| Heat treatment | Initial permeability ($\mu_o$) | Maximum permeability ($\mu_m$) | Residual magnetic flux density (G) | Coercive force (Oe) | Hysteresis loss (erg/cm³/ cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., colled to 600°C in furnace and further cooled to room temperature at speed of 100°C/hr. | 62,500 | 376,300 | 2,650 | 0.0044 | 6.65 | 5,670 | 84.6 | 209 |
| After said heat treatment, further heated in vacuum at 400°C for 1 hr. | 67,200 | 249,000 | 2,590 | 0.0048 | 7.23 | 5,665 | — | — |
| After heated in hydrogen atmosphere at 1,150°C for 3 hrs., colled to 600°C in furnace and further cooled to room temperature at speed of 50°C/hr. | 109,300 | 461,000 | 2,700 | 0.0036 | 5.97 | 5,675 | 84.9 | 207 |
| After said heat treatment, further heated in vacuum at 400°C for 30 min. | 86,400 | 327,000 | 2,680 | 0.0047 | 6.82 | 5,670 | — | — |
| After heated in hydrogen atmosphere at 1,150°C for 3 hrs., colled to 600°C in furnace and further cooled to room temperature at speed of 20°C/hr. | 46,600 | 244,500 | 2,530 | 0.0051 | 7.64 | 5,660 | 85.2 | 205 |
| After said heat treatment, further heated in vacuum at 400°C for 1 hr. | 38,500 | 203,600 | — | — | — | — | — | — |
| After heated in hydrogen atmosphere at 1,150°C for 3 hrs., cooled to 600°C in furnace and further cooled to room temperature at speed of 10°C/hr. | 27,300 | 189,000 | 2,630 | 0.0073 | 9.68 | 5,610 | 85.4 | 206 |
| After said heat treatment, further heated in vacuum at 400°C for 1 hr. | 20,400 | 152,700 | — | — | — | — | — | — |

EXAMPLE 2

The following test was made for alloy No. 96 including 79.6 percent of Ni, 11.4 percent of Fe, 7 percent of Nb and 2 percent of W.

As a starting material, nickel, iron and niobium having the same purity as in Example 1 and 99.9 percent of pure tungsten were used. The method for preparing a sample was the same as in Example 1. Various heat treatments were applied to the sample and the characteristic features as shown in Table 2 were obtained.

Table 2

| Heat treatment | Initial permeability ($\mu_o$) | Maximum permeability ($\mu_m$) | Residual magnetic flux density (G) | Coercive force (Oe) | Hysteresis loss (erg/cm³/ cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., cooled to 600°C in furnace and further cooled to room temperature at spped of 8,100°C/hr. | 34,200 | 197,000 | 2,880 | 0.0114 | 13.61 | 5,740 | 100.8 | 204 |
| After said heat treatment, further heated in vacuum at 400°C for 30 hrs. | 56,300 | 244,700 | — | — | — | — | — | — |
| After heated in hydrogen atmosphere at 1,150°C for 3 hrs., cooled to 600°C in furnace and further cooled to room temperature at speed of 2,800°C/hr. | 73,500 | 286,400 | 2,960 | 0.0056 | 8.47 | 5,780 | 100.6 | 204 |
| After said heat treatment, further heated in vacuum at 400°C for 10 hrs. | 65,100 | 271,500 | — | — | — | — | — | — |
| After heated in hydrogen atmosphere at 1,150°C for 3 hrs., cooled to 600°C in furnace and further cooled to room temperature at speed of 800°C/hr. | 81,200 | 314,500 | 3,100 | 0.0049 | 7.25 | 5,790 | 101.1 | 206 |
| After said heat treatment, further heated in vacuum at 400°C for 30 min. | 64,600 | 248,000 | 3,030 | 0.0063 | 9.28 | 5,760 | — | — |
| After heated in hydrogen atmosphere at 1,150°C for 3 hrs., cooled to 600°C in furnace and further cooled to room temperature at speed of 240°C/hr. | 52,200 | 254,000 | 3,080 | 0.0074 | 9.63 | 5,750 | 101.5 | 205 |
| After said heat treatment, further heated in vacuum at 400°C for 1 hr. | 39,800 | 203,000 | — | — | — | — | — | — |
| After heated in hydrogen atmosphere at 1,150°C for 3 hrs., cooled to 600°C in furnace and further cooled to room temperature at speed of 100°C/hr. | 36,260 | 246,000 | 3,040 | 0.0078 | 10.38 | 5,730 | 102.3 | 208 |
| After said heat treatment, further heated in vacuum at 400°C for 1 hr. | 25,700 | 168,900 | — | — | — | — | — | — |

EXAMPLE 3

The following test was made for alloy No. 130 including 79 percent of Ni, 11.7 percent of Fe, 7.2 percent of Nb and 2.1 percent of V.

As a starting material, nickel, iron and niobium having the same purity as in Example 1 and 99.8 percent of pure vanadium were used. The method for preparing a sample was the same as in Example 1. The characteristic features as shown in Table 3 were obtained by applying various heat treatments to the sample.

EXAMPLE 4

The following test was made for alloy No. 198 including 79 percent of Ni, 10.5 percent of Fe, 7 percent of Nb and 3.5 percent of Mn.

As a starting material, nickel, iron and niobium having the same purity as in Example 1 and 99.8 percent of pure manganese were used. The method for preparing a sample was the same as in Example 1. The characteristic features as shown in Table 4 were obtained by applying various heat treatments to the sample.

Table 3

| Heat treatment | Initial permeability ($\mu_o$) | Maximum permeability ($\mu_m$) | Residual magnetic flux density (G) | Coercive force (Oe) | Hysteresis loss (erg/cm³/cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., cooled to 600°C in furnace and further cooled to room temperature at speed of 2,800°C/hr. | 27,700 | 136,000 | 2,690 | 0.0106 | 11.64 | 5,250 | 75.1 | 208 |
| After said heat treatment, further heated in vacuum at 400°C for 3 hrs. | 48,600 | 172,100 | — | — | — | — | — | — |
| After heated in hydrogen atmosphere at 1,150°C for 3 hrs., cooled to 600°C in furnace and further cooled to room temperature at speed of 800°C/hr. | 40,600 | 185,000 | 2,720 | 0.0063 | 8.10 | 5,270 | 74.3 | 210 |
| After said heat treatment, further heated in vacuum at 400°C for 1 hr. | 51,300 | 173,500 | 2,780 | 0.0060 | 7.24 | 5,280 | — | — |
| After heated in hydrogen atmosphere at 1,150°C for 3 hrs., cooled to 600°C in furnace and further cooled to room temperature at speed of 400°C/hr. | 68,400 | 236,800 | 2,800 | 0.0045 | 6.30 | 5,300 | 75.6 | 207 |
| After said heat treatment, further heated in vacuum at 400°C for 30 min. | 46,400 | 172,800 | 2,640 | 0.0085 | 9.74 | 5,280 | — | — |
| After heated in hydrogen atmosphere at 1,150°C for 3 hrs., cooled to 600°C in furnace and further cooled to room temperature at speed of 240°C/hr. | 51,300 | 194,300 | 2,750 | 0.0058 | 7.52 | 5,230 | 75.9 | 205 |
| After said heat treatment, urther heated in vacuum at 400°C for 1 hr. | 38,700 | 136,100 | — | — | — | — | — | — |
| After heated in hydrogen atmosphere at 1,150°C for 3 hrs., cooled to 600°C in furnace and further cooled to room temperature at speed of 100°C/hr. | 35,800 | 127,300 | 2,960 | 0.0096 | 10.35 | 5,200 | 76.1 | 208 |
| After said heat treament, further heated in vacuum at 400°C for 1 hr. | 26,400 | 105,000 | 2,840 | 0.0120 | 13.46 | 5,220 | — | — |

Table 4

| Heat treatment | Initial permeability ($\mu_o$) | Maximum permeability ($\mu_m$) | Residual magnetic flux density (G) | Coercive force (Oe) | Hysteresis loss (erg/cm³/cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., cooled to 600°C in furnace and further cooled to room temperature at speed of 2,800°C/hr. | 16,200 | 115,700 | 2,550 | 0.0137 | 17.38 | 6,010 | 71.2 | 214 |
| After said heat treatment, further heated in vacuum at 400°C for 3 hrs. | 38,600 | 149,500 | — | — | — | — | — | — |
| After heated in hydrogen atmosphere at 1,150°C for 3 hrs., cooled to 600°C in furnace and further cooled to room temperature at speed of 800°C/hr. | 34,700 | 164,400 | 2,600 | 0.0085 | 13.64 | 6,060 | 71.6 | 208 |
| After said heat treatment, further heated in vacuum at 400°C for 1 hr. | 41,000 | 156,300 | 2,580 | 0.0076 | 12.71 | 6,090 | — | — |

Table 4—Continued

| Heat treatment | Initial permeability ($\mu_o$) | Maximum permeability ($\mu_m$) | Residual magnetic flux density (G) | Coercive force (Oe) | Hysteresis loss (erg/cm³/cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., cooled to 600°C in furnace and further cooled to room temperature at speed of 400°C/hr. | 69,600 | 224,100 | 2,570 | 0.0063 | 10.47 | 6,180 | 71.2 | 212 |
| After said heat treatment, further heated in vacuum at 400°C for 30 min. | 47,800 | 175,000 | 2,620 | 0.0072 | 12.59 | 6,080 | — | — |
| After heated in hydrogen atmosphere at 1,150°C for 3 hrs., cooled to 600°C in furnace and further cooled to room temperature at speed of 240°C/hr. | 39,600 | 153,100 | 2,540 | 0.0091 | 14.37 | 6,000 | 71.4 | 210 |
| After said heat treatment, further heated in vacuum at 400°C for 1 hr. | 23,200 | 139,400 | — | — | — | — | — | — |
| After heated in hydrogen atmosphere at 1,150°C for 3 hrs., cooled to 600°C in furnace and further cooled to room temperature at speed of 100°C/hr. | 23,800 | 126,400 | 2,560 | 0.0117 | 18.50 | 6,020 | 70.6 | 209 |
| After said heat treatment, further heated in vacuum at 400°C for 1 hr. | 14,200 | 103,700 | — | — | — | — | — | — |

EXAMPLE 5

The following test was made for alloy No. 275 including 79.5 percent of Ni, 10.3 percent of Fe, 9 percent of Nb and 1.2 percent of Ti.

As a starting material, nickel, iron and niobium having the same purity as in Example 1 and 99.8 percent of titanium were used. The method for preparing a sample was the same as in Example 1. The characteristic features as shown in Table 5 were obtained by applying various heat treatments to the sample.

Table 5

| Heat treatment | Initial permeability ($\mu_o$) | Maximum permeability ($\mu_m$) | Residual magnetic flux density (G) | Coercive force (Oe) | Hysteresis loss (erg/cm³/cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=10 Oe | | |
| After heated in hydrogen atmosphere at 1,150°C for 3 hrs., cooled to 600°C in furnace and further cooled to room temperature at speed of 2,800°C/hr. | 18,400 | 126,400 | 2,550 | 0.0126 | 15.63 | 5,260 | 91.4 | 264 |
| After said heat treatment, further heated in vacuum at 400°C for 3 hrs. | 37,800 | 145,200 | — | — | — | — | — | — |
| After heated in hydrogen atmosphere at 1,150°C for 3 hrs., cooled to 600°C in furnace and further cooled to room temperature at speed of 800°C/hr. | 35,700 | 183,900 | 2,620 | 0.0083 | 10.25 | 5,320 | 90.9 | 261 |
| After said heat treatment, further heated in vacuum at 400°C for 1 hr. | 46,500 | 153,700 | 2,570 | 0.0078 | 9.46 | 5,300 | — | — |
| After heated in hydrogen atmosphere at 1,150°C for 3 hrs., cooled to 600°C in furnace and further cooled to room temperature at speed of 400°C/hr. | 53,700 | 236,000 | 2,420 | 0.0060 | 8.23 | 5,380 | 90.7 | 263 |
| After said heat treatment, further heated in vacuum at 400°C for 30 min. | 39,500 | 184,200 | 2,530 | 0.0084 | 10.68 | 5,320 | — | — |
| After heated in hydrogen atmosphere at 1,150°C for 3 hrs., cooled to 600°C in furnace and further cooled to room temperature at speed of 240°C/hr. | 47,200 | 175,000 | 2,510 | 0.0072 | 9.74 | 5,350 | 91.3 | 260 |
| After said heat treatment, further heated in vacuum at 400°C for 1 hr. | 32,500 | 138,600 | — | — | — | — | — | — |
| After heated in hydrogen atmosphere at 1,150°C for 3 hrs., cooled to 600°C in furnace and further cooled to room temperature at speed of 100°C/hr. | 21,600 | 116,800 | 2,480 | 0.0098 | 11.63 | 5,320 | 90.5 | 262 |
| After said heat treatment, further heated in vacuum at 400°C for 1 hr. | 17,400 | 109,100 | — | — | — | — | — | — |

EXAMPLE 6

The following test was made for alloy No. 530 including 81 percent of Ni, 8.7 percent of Fe, 7.1 percent of Nb, 2 percent of Mo and 1.2 percent of Si.

As a starting material, nickel, iron, niobium and molybdenum having the same purity as in Example 1 and 99.8 percent of silicon were used. The method for preparing a sample was the same as in Example 1. The characteristic features as shown in Table 6 were obtained by applying various heat treatments to the sample.

EXAMPLE 7

The following test was made for alloy No. 702 including 79 percent of Ni, 9.3 percent of Fe, 7.5 percent of Nb, 1 percent of Ti and 3.2 percent of W.

As a starting material, nickel, iron, niobium, titanium and tungsten having the same purity as in above Examples were used. The method for preparing a sample was the same as in Example 1. The characteristic features as shown in Table 7 were obtained by applying various heat treatments to the sample.

Table 6

| Heat treatment | Initial permeability ($\mu_o$) | Maximum permeability ($\mu_m$) | Residual magnetic flux density (G) Maximum magnetic flux density=5,000 G | Coercive force (Oe) | Hysteresis loss (erg/cm³/cycle) | Saturated magnetic flux density (G) Magnetic field=10 Oe | Specific electric resistance ($\mu\Omega$-cm) | Vickers hardness Hv |
|---|---|---|---|---|---|---|---|---|
| After heated in hydrogen atmosphere at 1,150°C for 3 hrs., cooled to room temperature at speed of 2,800°C/hr. | 10,300 | 106,400 | 2,160 | 0.0120 | 14.73 | 5,030 | 91.6 | 235 |
| After said heat treatment, further heated in vacuum at 400°C for 3 hrs. | 27,500 | 183,000 | — | — | — | — | — | — |
| After heated in hydrogen atmosphere at 1,150°C for 3 hrs., cooled to 600°C in furnace and further cooled to room temperature at speed of 800°C/hr. | 36,000 | 207,400 | 2,200 | 0.0083 | 11.04 | 5,060 | 92.0 | 233 |
| After said heat treatment, further heated in vacuum at 400°C for 1 hr. | 38,100 | 205,600 | 2,180 | 0.0078 | 10.50 | 5,080 | — | — |
| After heated in hydrogen atmosphere at 1,150°C for 3 hrs., cooled to 600°C in furnace and further cooled to room temperature at speed of 400°C/hr. | 46,200 | 218,200 | 2,210 | 0.0062 | 8.43 | 5,070 | 92.4 | 232 |
| After said heat treatment, further heated in vacuum at 400°C for 30 min. | 31,800 | 172,000 | 2,240 | 0.0075 | 9.81 | 5,050 | — | — |
| After heated in hydrogen atmosphere at 1,150°C for 3 hrs., cooled to 600°C in furnace and further cooled to room temperature at speed of 240°C/hr. | 34,600 | 186,000 | 2,230 | 0.0073 | 10.08 | 5,100 | 93.0 | 230 |
| After said heat treatment, further heated in vacuum at 400°C for 1 hr. | 20,500 | 137,000 | — | — | — | — | — | — |
| After heated in hydrogen atmosphere at 1,150°C for 3 hrs., cooled to 600°C in furnace and further cooled to room temperature at speed of 100°C/hr. | 19,100 | 146,600 | 2,160 | 0.0104 | 13.64 | 5,080 | 92.7 | 233 |
| After said heat treatment, further heated in vacuum at 400°C for 1 hr. | 13,500 | 113,000 | — | — | — | — | — | — |

Table 7

| Heat treatment | Initial permeability ($\mu_o$) | Maximum permeability ($\mu_m$) | Residual magnetic flux density (G) Maximum magnetic flux density=5,000 G | Coercive force (Oe) | Hysteresis loss (erg/cm³/cycle) | Saturated magnetic flux density (G) Magnetic field=900 Oe | Specific electric resistance ($\mu\Omega$-cm) | Vickers hardness Hv |
|---|---|---|---|---|---|---|---|---|
| After heated in hydrogen atmosphere at 1,150°C for 3 hrs., cooled to 600°C in furnace and further cooled to room temperature at speed of 9°C/sec. | 12,500 | 106,000 | 2,380 | 0.0135 | 13.63 | 5,170 | 82.5 | 213 |
| After said heat treatment, further heated in vacuum at 400°C for 30 min. | 35,300 | 194,300 | — | — | — | — | — | — |
| After heated in hydrogen atmosphere at 1,150°C for 3 hrs., cooled to 600°C in furnace and further cooled to room temperature at speed of 800°C/hr. | 19,600 | 174,000 | 2,380 | 0.0113 | 11.76 | 5,180 | 82.0 | 211 |
| After said heat treatment, further heated in vacuum at 400°C for 1 hr. | 29,500 | 230,400 | — | — | — | — | — | — |
| After heated in hydrogen atmosphere at 1,150°C for 3 hrs., cooled to 600°C in furnace and further cooled to room temperature at speed of 400°C/hr. | 28,300 | 227,000 | 2,420 | 0.0095 | 10.14 | 5,190 | 82.3 | 212 |

Table 7—Continued

| Heat treatment | Initial permeability ($\mu_o$) | Maximum permeability ($\mu_m$) | Residual magnetic flux density (G) | Coercive force (Oe) | Hysteresis loss (erg/cm³/cycle) | Saturated magnetic flux density (G) | Specific electric resistance ($\mu\Omega$-cm) | Vickers hardness Hv |
|---|---|---|---|---|---|---|---|---|
| | | | Maximum magnetic flux density=5,000 G | | | Magnetic field=900 Oe | | |
| After said heat treatment, further heated in vacuum at 400°C for 30 min. | 34,800 | 231,600 | — | — | — | — | — | — |
| After heated in hydrogen atmosphere at 1,150°C for 3 hrs., cooled to 600°C in furnace and further cooled to room temperature at speed of 100°C/hr. | 46,600 | 294,000 | 2,400 | 0.0070 | 7.84 | 5,170 | 82.5 | 210 |
| After said heat treatment, further heated in vacuum at 400°C for 1 hr. | 35,500 | 247,000 | — | — | — | — | — | — |
| After heated in hydrogen atmosphere at 1,150°C for 3 hrs., cooled to 600°C in furnace and further cooled to room temperature at speed of 10°C/hr. | 27,400 | 183,000 | 2,410 | 0.0098 | 10.83 | 5,180 | 82.4 | 211 |
| After said heat treatment, further heated in vacuum at 400°C for 1 hr. | 22,300 | 137,400 | — | — | — | — | — | — |

In the above examples, metallic niobium and metallic vanadium each having a purity of 99.8 percent were used, but ferro-niobium and ferro-vanadium available on the market can be used instead of metallic niobium and metallic vanadium, respectively. In such a case, these alloys are slightly brittle, so that it is necessary to use manganese, silicon, aluminum, titanium, boron, calcium alloys, magnesium alloys and other deoxidizing agent or desulfurizer for melting the alloys to sufficiently deoxidize and desulfurize them and to give malleability to them.

Further, in the above examples, each alloy is heated at a temperature of 1,150°C for 3 hours, cooled at 600°C in the furnace, and further applied various heat treatments, but the heating temperature can be more than 800°C, preferably more than 1,100°C, and less than the melting point, and the heating time can be more than 1 minute to less than about 100 hours.

The characteristics of the typical alloys are as shown in Table 8.

TABLE 8 (1)

| Alloy No. | Composition (percent) | | | | Cooling speed from 600°C. after heating at 1,150°C. (°C./hr.) | Reheating | | Initial permeability ($\mu_o$) | Maximum permeability ($\mu_m$) | Residual magnetic flux density (G) | Coercive force (Oc.) | Hysteresis loss (erg/cm.³/cycle) | Saturated magnetic flux density (G) | Specific electric resistance ($\mu\Omega$-cm.) | Vickers hardness (Hv) |
|---|---|---|---|---|---|---|---|---|---|---|---|---|---|---|---|
| | Ni | Fe | Nb | | | Temp. (°C.) | Hour | | | Maximum magnetic flux density=5,000 G | | | Magnetic field=10 Oc. | | |
| 7 | 79.6 | 12.2 | 3.1 | 5.1Mo | 100 | 400 | 5 | 30,200 | 118,600 | — | — | — | 5,580 | 76.4 | 195 |
| 16 | 79.8 | 12.9 | 5.0 | 2.3 | 100 | | | 74,700 | 232,500 | 2,650 | 0.0048 | 6.41 | 5,810 | 72.8 | 210 |
| 31 | 80.0 | 10.9 | 7.0 | 2.1 | 50 | | | 109,300 | 461,000 | 2,700 | 0.0036 | 5.97 | 5,675 | 84.9 | 207 |
| 45 | 79.5 | 10.4 | 9.1 | 1.0 | 50 | | | 56,600 | 214,000 | 2,430 | 0.0051 | 6.35 | 5,270 | 83.2 | 213 |
| 47 | 79.2 | 7.7 | 12.1 | 1.0 | 50 | 400 | 10 | 9,050 | 50,900 | 2,330 | 0.0174 | 14.50 | 5,010 | 102.0 | 233 |
| 49 | 78.0 | 7.0 | 14.0 | 1.0 | 10 | 400 | 70 | 3,500 | 5,500 | | | | | | |
| 50 | 79.5 | 14.3 | 3.1 | 3.1Cr | 100 | 400 | 85 | 21,700 | 103,000 | | | | 5,020 | | |
| 58 | 80.3 | 11.5 | 5.0 | 3.2 | 100 | | | 44,370 | 157,700 | 2,480 | 0.0073 | 9.63 | 5,280 | 86.2 | 163 |
| 61 | 80.5 | 10.3 | 7.1 | 2.1 | 400 | | | 64,250 | 183,000 | 2,250 | 0.0061 | 7.56 | 5,040 | 90.3 | 198 |
| 73 | 80.2 | 9.5 | 9.0 | 1.3 | 100 | 420 | 7 | 26,600 | 153,600 | | | | 4,850 | 91.8 | 207 |
| 82 | 79.0 | 10.7 | 3.3 | 7.0W | 400 | 400 | 60 | 17,100 | 109,400 | | | | 4,750 | | |
| 88 | 79.4 | 12.2 | 5.2 | 4.2 | 400 | | | 23,300 | 125,200 | 2,890 | 0.0065 | 9.40 | 6,330 | 68.3 | 187 |
| 96 | 79.6 | 11.4 | 7.0 | 2.0 | 800 | | | 81,200 | 314,500 | 3,100 | 0.0049 | 7.25 | 5,790 | 101.1 | 206 |
| 105 | 80.0 | 8.8 | 9.1 | 2.1 | 240 | | | 54,650 | 271,200 | | | | 4,820 | 103.4 | 218 |
| 110 | 79.5 | 12.2 | 3.1 | 5.2V | 100 | 400 | 3 | 26,800 | 179,300 | | | | 5,620 | | |
| 123 | 79.0 | 13.9 | 5.1 | 2.0 | 240 | | | 43,160 | 185,100 | 2,740 | 0.0052 | 7.04 | 5,870 | 70.6 | 198 |
| 130 | 79.0 | 11.7 | 7.2 | 2.1 | 400 | | | 68,400 | 236,800 | 2,800 | 0.0045 | 6.30 | 5,300 | 75.6 | 207 |
| 138 | 79.1 | 10.7 | 9.0 | 1.2 | 400 | | | 32,700 | 171,500 | 2,460 | 0.0056 | 6.62 | 5,050 | 74.0 | 216 |
| 141 | 79.3 | 16.2 | 1.5 | 3.0Ta | 2,800 | | | 12,400 | 116,000 | 3,500 | 0.0215 | 40.37 | 9,050 | 45.0 | 152 |
| 143 | 79.5 | 16.4 | 2.8 | 1.3 | 800 | | | 14,300 | 124,500 | 3,460 | 0.0197 | 35.24 | 8,830 | 47.2 | 173 |
| 144 | 79.0 | 15.0 | 3.0 | 3.0 | 800 | | | 15,500 | 143,800 | 3,380 | 0.0163 | 33.72 | 7,960 | 55.6 | 180 |
| 146 | 78.0 | 11.7 | 3.2 | 7.1 | 240 | 400 | 20 | 22,400 | 164,000 | | | | 6,500 | | |
| 155 | 79.6 | 9.3 | 5.0 | 7.1 | 240 | 400 | 15 | 44,700 | 206,000 | 2,700 | 0.0072 | 8.56 | 6,110 | 68.9 | 212 |
| 163 | 79.3 | 8.5 | 7.2 | 5.0 | 100 | | | 67,000 | 281,000 | 2,350 | 0.0054 | 6.17 | 6,020 | 72.3 | 217 |
| 180 | 79.5 | 8.2 | 9.1 | 3.2 | 100 | | | 35,950 | 176,500 | 2,420 | 0.0068 | 7.39 | 5,370 | 74.6 | 238 |
| 187 | 76.5 | 12.2 | 3.1 | 8.2Mn | 800 | | | 16,300 | 114,800 | | | | 7,300 | | |
| 191 | 77.4 | 12.4 | 5.2 | 5.0 | 400 | | | 32,700 | 151,000 | 2,650 | 0.0077 | 11.05 | 6,650 | 66.1 | 173 |
| 198 | 79.0 | 10.5 | 7.0 | 3.5 | 400 | | | 69,600 | 224,100 | 2,570 | 0.0063 | 10.47 | 6,180 | 71.2 | 212 |
| 210 | 79.5 | 8.3 | 9.2 | 3.0 | 240 | | | 37,000 | 153,500 | 2,510 | 0.0084 | 12.60 | 5,840 | 75.3 | 226 |
| 217 | 79.2 | 12.7 | 3.1 | 5.0Ge | 800 | | | 13,600 | 134,000 | | | | 6,440 | | |
| 224 | 79.5 | 12.3 | 5.0 | 3.2 | 400 | | | 62,700 | 191,700 | 2,500 | 0.0059 | 8.22 | 6,230 | 84.2 | 164 |
| 231 | 80.0 | 9.8 | 7.2 | 3.0 | 240 | | | 73,200 | 264,500 | 2,550 | 0.0056 | 7.90 | 5,550 | 90.5 | 195 |
| 243 | 79.3 | 10.5 | 9.1 | 1.1 | 240 | | | 35,900 | 228,500 | 2,630 | 0.0071 | 9.81 | 5,780 | 88.7 | 207 |
| 251 | 80.0 | 12.9 | 3.1 | 4.0Ti | 800 | | | 10,600 | 113,000 | | | | 5,740 | | |
| 253 | 79.1 | 16.9 | 3.5 | 0.5 | 8,100 | | | 16,400 | 128,000 | | | | 8,980 | 45.0 | 167 |
| 255 | 79.5 | 13.2 | 5.0 | 0.3 | 800 | | | 28,000 | 177,000 | 3,650 | 0.0080 | 17.23 | 7,870 | 57.3 | 185 |
| 260 | 79.8 | 11.9 | 5.2 | 3.1 | 400 | | | 28,100 | 175,000 | 2,470 | 0.0105 | 11.35 | 5,200 | 76.5 | 285 |
| 268 | 79.5 | 11.4 | 7.1 | 2.0 | 400 | | | 46,200 | 283,500 | 2,630 | 0.0074 | 9.74 | 5,670 | 88.5 | 278 |
| 275 | 79.5 | 10.3 | 9.0 | 1.2 | 400 | | | 53,700 | 236,000 | 2,420 | 0.0060 | 8.23 | 5,380 | 90.7 | 263 |
| 276 | 79.8 | 10.7 | 9.2 | 0.3 | 400 | | | 36,200 | 245,000 | 2,740 | 0.0067 | 13.42 | 6,020 | 75.4 | 218 |
| 279 | 79.7 | 8.3 | 11.3 | 0.7 | 240 | | | 12,600 | 73,000 | 2,440 | 0.0152 | 18.40 | 5,040 | 96.2 | 265 |
| 281 | 79.1 | 8.3 | 12.4 | 0.2 | 240 | | | 17,500 | 86,200 | | | | 3,920 | 81.6 | 235 |

TABLE 8 (1)—Continued

| Alloy No. | Composition (percent) | | | | Cooling speed from 600°C. after heating at 1,150°C (°C./hr.) | Reheating | | Initial permeability ($\mu_0$) | Maximum permeability ($\mu_m$) | Residual magnetic flux density (G) Maximum magnetic flux density=5,000 G | Coercive force (Oe.) | Hysteresis loss (erg/cm.³/cycle) | Saturated magnetic flux density (G) Magnetic field=10 Oc. | Specific electric resistance (μΩ-cm.) | Vickers hardness (Hv) |
|---|---|---|---|---|---|---|---|---|---|---|---|---|---|---|---|
| | Ni | Fe | Nb | | | Temp. (°C.) | Hour | | | | | | | | |
| 283 | 79.0 | 14.8 | 3.2 | 3.0Zr | 800 | | | 11,400 | 112,200 | | | | 8,100 | | |
| 288 | 79.5 | 14.2 | 5.2 | 1.1 | 400 | | | 28,500 | 145,700 | 3,050 | 0.0093 | 14.35 | 6,890 | 73.8 | 228 |
| 295 | 79.6 | 12.4 | 7.0 | 1.0 | 400 | | | 36,600 | 173,000 | 2,840 | 0.0081 | 12.68 | 6,220 | 84.2 | 263 |
| 300 | 81.0 | 12.9 | 3.1 | 3.0Al | 240 | | | 13,400 | 102,000 | | | | 5,370 | | 285 |
| 307 | 80.6 | 12.2 | 5.0 | 2.2 | 400 | | | 28,800 | 157,000 | 2,340 | 0.0112 | 13.28 | 5,890 | 79.3 | 302 |
| 309 | 82.0 | 9.9 | 6.0 | 2.1 | 800 | | | 16,600 | 157,000 | 2,470 | 0.0123 | 15.27 | 5,530 | 79.7 | 335 |
| 312 | 81.5 | 10.4 | 7.1 | 1.0 | 800 | 400 | 3 | 22,600 | 163,000 | 2,380 | 0.0108 | 13.04 | 5,380 | 79.0 | 323 |
| 315 | 80.2 | 9.6 | 9.0 | 1.2 | 400 | | | 47,200 | 163,600 | 2,470 | 0.0103 | 11.73 | 5,350 | 80.5 | 359 |
| 317 | 81.0 | 8.6 | 9.9 | 0.5 | 240 | | | 19,600 | 108,100 | 2,350 | 0.0137 | 15.61 | 5,300 | 91.7 | 322 |
| 326 | 80.8 | 13.0 | 3.2 | 3.0Si | 800 | | | 10,500 | 101,000 | | | | 5,500 | | |
| 333 | 80.5 | 12.4 | 5.0 | 2.1 | 400 | | | 28,000 | 146,000 | 2,870 | 0.0055 | 7.46 | 5,300 | 75.8 | 200 |
| 340 | 80.2 | 11.5 | 7.2 | 1.1 | 800 | | | 30,640 | 191,500 | 3,050 | 0.0043 | 6.72 | 5,420 | 76.5 | 230 |
| 343 | 81.3 | 8.6 | 9.6 | 0.5 | 240 | | | 18,600 | 175,000 | 2,280 | 0.0076 | 9.31 | 5,310 | 81.6 | 246 |
| 348 | 79.2 | 12.6 | 3.2 | 5.0Sn | 100 | 400 | 10 | 12,500 | 116,000 | | | | 8,380 | | |
| 356 | 79.5 | 13.4 | 5.0 | 2.1 | 400 | | | 26,700 | 152,500 | 3,080 | 0.0110 | 12.58 | 7,160 | 67.9 | 207 |
| 365 | 80.0 | 9.7 | 9.1 | 1.2 | 400 | | | 20,300 | 138,000 | 2,640 | 0.0124 | 14.16 | 5,690 | 76.4 | 245 |
| 373 | 79.0 | 12.8 | 3.1 | 5.1Sb | 100 | 400 | 35 | 17,200 | 136,400 | | | | 8,570 | | |
| 381 | 79.3 | 13.5 | 5.0 | 2.2 | 800 | | | 24,600 | 158,000 | 2,770 | 0.0093 | 11.30 | 6,980 | 63.2 | 216 |
| 389 | 79.9 | 9.6 | 9.2 | 1.3 | 400 | | | 22,500 | 117,300 | 2,530 | 0.0107 | 10.72 | 5,700 | 75.7 | 238 |
| 396 | 76.0 | 10.3 | 3.2 | 10.5Co | 800 | | | 13,500 | 104,600 | | | | 9,860 | | |
| 408 | 76.3 | 13.6 | 5.0 | 5.1 | 400 | | | 24,600 | 131,000 | 3,090 | 0.0110 | 11.73 | 7,240 | 64.3 | 172 |
| 415 | 77.5 | 12.2 | 7.1 | 3.2 | 400 | | | 37,000 | 174,000 | 3,150 | 0.0074 | 9.68 | 6,505 | 69.1 | 195 |
| 423 | 78.2 | 10.5 | 9.0 | 2.3 | 400 | | | 18,200 | 105,300 | 3,020 | 0.0120 | 13.48 | 5,840 | 71.8 | 223 |
| 434 | 76.4 | 10.2 | 3.2 | 10.2Cu | 800 | | | 17,500 | 104,400 | | | | 5,930 | | 165 |
| 460 | 78.7 | 10.9 | 7.2 | 3.2 | 240 | | | 57,900 | 307,000 | 2,400 | 0.0051 | 7.35 | 5,860 | 72.3 | 210 |
| 468 | 79.5 | 10.3 | 9.1 | 1.1 | 400 | | | 46,400 | 174,400 | 2,460 | 0.0073 | 9.12 | 5,270 | 70.5 | 226 |

TABLE 8 (2)

| Alloy No. | Composition (percent) | | | | | Cooling speed from 600°C. after heating at 1,150°C (°C./hr.) | Reheating | | Initial permeability ($\mu_0$) | Maximum permeability ($\mu_m$) | Residual magnetic flux density (G) Maximum magnetic flux density=5,000 G | Coercive force (Oe.) | Hysteresis loss (erg/cm.³/cycle) | Saturated magnetic flux density (G) Magnetic field=10 Oe. | Specific electric resistance (μΩ-cm.) | Vickers hardness (Hv) |
|---|---|---|---|---|---|---|---|---|---|---|---|---|---|---|---|---|
| | Ni | Fe | Nb | | | | Temp. (°C.) | Hour | | | | | | | | |
| 513 | 80.7 | 7.9 | 7.5 | 2.2Mo | 1.7Ti | 400 | | | 35,000 | 273,600 | 2,330 | 0.0063 | 8.61 | 5,020 | 88.3 | 235 |
| 521 | 81.3 | 9.5 | 6.3 | 2.1 | 0.8Al | 800 | | | 17,400 | 153,000 | 2,150 | 0.0157 | 17.80 | 5,050 | 90.7 | 315 |
| 530 | 81.0 | 8.7 | 7.1 | 2.0 | 1.2Si | 400 | | | 46,200 | 218,100 | 2,210 | 0.0062 | 8.43 | 5,070 | 92.4 | 232 |
| 542 | 79.8 | 10.2 | 6.5 | 2.0Cr | 1.5Ti | 240 | 400 | 3 | 37,800 | 174,000 | 2,350 | 0.0085 | 11.60 | 5,860 | 88.3 | 240 |
| 553 | 78.7 | 9.7 | 5.8 | 2.5 | 3.3W | 240 | 420 | 5 | 85,700 | 283,000 | 2,270 | 0.0045 | 6.55 | 5,520 | 98.5 | 185 |
| 566 | 78.5 | 10.2 | 7.3 | 3.0W | 1.0Si | 800 | | | 59,600 | 228,000 | 2,350 | 0.0062 | 7.74 | 5,340 | 95.3 | 233 |
| 578 | 79.0 | 11.3 | 6.4 | 2.6V | 0.7Al | 800 | | | 28,000 | 145,000 | 2,150 | 0.0177 | 14.62 | 5,460 | 83.4 | 274 |
| 591 | 78.5 | 10.9 | 6.3 | 1.8 | 2.5Ta | 400 | | | 87,200 | 364,000 | 2,400 | 0.0042 | 6.03 | 5,780 | 85.7 | 213 |
| 612 | 78.6 | 11.4 | 5.5 | 3.0Ta | 1.5Ti | 400 | | | 46,300 | 176,000 | 2,380 | 0.0083 | 10.40 | 5,660 | 83.2 | 238 |
| 624 | 79.7 | 8.8 | 7.2 | 3.5Mn | 0.8Sn | 240 | | | 34,800 | 135,000 | 2,160 | 0.0096 | 12.45 | 6,070 | 82.5 | 225 |
| 635 | 79.5 | 9.3 | 7.5 | 3.0 | 0.7Sb | 240 | | | 31,000 | 110,300 | 2,190 | 0.0115 | 13.06 | 6,100 | 81.8 | 220 |
| 648 | 80.0 | 9.7 | 7.0 | 2.5Ge | 0.8Zr | 400 | | | 43,400 | 156,000 | 2,270 | 0.0087 | 12.74 | 5,920 | 79.6 | 236 |
| 663 | 79.3 | 8.6 | 7.6 | 3.7Co | 0.8Si | 240 | 450 | 10 | 37,100 | 166,300 | 2,360 | 0.0153 | 13.75 | 6,840 | 76.4 | 242 |
| 672 | 79.0 | 9.0 | 7.0 | 3.0 | 2.0Mo | 240 | 400 | 25 | 43,600 | 172,000 | 2,220 | 0.0136 | 12.86 | 6,500 | 77.0 | 206 |
| 685 | 79.6 | 7.7 | 7.2 | 3.0Cu | 2.5Cr | 100 | 420 | 30 | 75,000 | 253,000 | 2,180 | 0.0050 | 7.64 | 6,170 | 83.2 | 210 |
| 690 | 80.1 | 9.4 | 6.8 | 3.0 | 0.7Ti | 100 | 400 | 10 | 48,600 | 185,900 | 2,230 | 0.0073 | 9.80 | 5,880 | 82.6 | 245 |
| 702 | 79.0 | 9.3 | 7.5 | 1.0Ti | 3.2W | 100 | | | 46,600 | 294,000 | 2,400 | 0.0070 | 7.84 | 5,170 | 82.5 | 210 |
| 710 | 79.0 | 7.7 | 9.0 | 1.2 | 3.1Mn | 400 | | | 27,000 | 162,000 | 2,380 | 0.0107 | 12.72 | 5,800 | 81.6 | 243 |
| 724 | 80.2 | 10.5 | 7.3 | 1.0 | 1.0Al | 800 | | | 18,400 | 104,000 | 2,350 | 0.0180 | 16.30 | 5,570 | 78.4 | 326 |
| 750 | 80.3 | 10.6 | 7.0 | 1.1 | 1.0Si | 240 | | | 23,400 | 130,000 | 2,460 | 0.0104 | 9.79 | 5,560 | 75.6 | 230 |

As understood from the above characteristic diagrams, examples and Table 8, the maximum values of the initial permeability and the maximum permeability of the alloy according to the present invention, which is prepared by adding the amount of subingredient of less than 10 percent by weight in total selected from the group consisting of Mo, Cr, W, V, Ta, Mn, Ge, Ti, Zr, Al, Si, Sn, Sb, Co and Cu to the Ni-Fe-Nb alloy, are very large, and the initial permeability and the maximum permeability of the alloy (alloy No. 31 in Table 8) consisting of 80 percent of Ni, 10.9 percent of Fe, 7 percent of Nb and 2.1 percent of Mo, which is heated at a temperature of 1,150°C for 3 hours, cooled to 600°C in the furnace, maintained at the same temperature for 10 minutes, then cooled to a room temperature at a speed of 50°C/hour, are 109,300 and 461,000, respectively, and the Vickers hardness Hv is 207. These characteristics are larger than the initial permeability of 64,000, the maximum permeability of 409,600 and the hardness Hv of 210 of the alloy consisting of 80.5 percent of Ni, 11.1 percent of Fe and 8.4 percent of Nb, which is heated at a temperature of 1,250°C for 9 hours, cooled to 600°C in the furnace, maintained at the same temperature for 10 minutes, and cooled to a room temperature at a speed of 240°C/hour.

Further, the characteristics of another typical alloys are shown in Table 9.

TABLE 9

| Alloy No. | Composition (percent) | | | | | Cooling speed from 600°C. after heating at 1,150°C. (°C./hr.) | Reheating | | Initial permeability ($\mu_0$) | Maximum permeability ($\mu_m$) | Residual magnetic flux density (G) Maximum magnetic flux density=5,000 G | Coercive force (Oe.) | Hysteresis loss (erg/cm³/cycle) | Saturated magnetic flux density (G) Magnetic field =10 Oe. | Specific electric resistance ($\mu\Omega$-cm.) | Vickers hardness (Hv) |
|---|---|---|---|---|---|---|---|---|---|---|---|---|---|---|---|---|
| | Ni | Fe | Nb | Ta | | | Temp. (°C.) | Hour | | | | | | | | |
| 820 | 79.5 | 11.5 | 2.9 | 3.0 | 3.1Mo | 100 | | | 62,800 | 337,000 | 3,220 | 0.0073 | 12.20 | 6,470 | 80.3 | 178 |
| 826 | 79.7 | 10.8 | 3.0 | 2.8 | 2.5 1.2Ti | 240 | | | 45,100 | 218,300 | 3,070 | 0.0080 | 16.50 | 6,350 | 78.6 | 237 |
| 837 | 80.0 | 10.9 | 2.8 | 2.8 | 2.5 1.0Si | 800 | 400 | 3 | 36,000 | 230,600 | 2,730 | 0.0094 | 15.82 | 5,760 | 80.3 | 228 |
| 843 | 79.0 | 11.7 | 3.0 | 3.1 | 3.2Cr | 240 | 400 | 15 | 56,500 | 192,000 | 2,560 | 0.0082 | 15.37 | 5,890 | 79.0 | 177 |
| 848 | 79.8 | 13.2 | 1.5 | 2.3 | 2.1 1.1Al | 100 | | | 18,800 | 153,300 | 2,310 | 0.0164 | 18.41 | 5,300 | 85.8 | 303 |
| 852 | 78.3 | 10.8 | 3.0 | 2.8 | 5.1W | 400 | | | 47,300 | 226,900 | 3,100 | 0.0091 | 17.40 | 6,570 | 92.6 | 175 |
| 860 | 79.2 | 11.0 | 3.1 | 2.5 | 4.2V | 800 | | | 52,100 | 246,000 | 3,010 | 0.0087 | 17.72 | 6,350 | 88.2 | 180 |
| 865 | 79.5 | 11.7 | 2.3 | 2.7 | 3.0 0.8Zr | 400 | | | 36,500 | 164,700 | 2,730 | 0.0098 | 16.30 | 6,270 | 87.8 | 212 |
| 880 | 79.0 | 10.5 | 3.1 | 2.9 | 4.5Mn | 400 | | | 20,400 | 169,400 | 3,530 | 0.0134 | 35.10 | 6,970 | 70.7 | 184 |
| 884 | 79.3 | 11.0 | 2.5 | 3.0 | 3.0 1.2Sn | 800 | | | 15,000 | 136,000 | 3,370 | 0.0172 | 38.32 | 6,750 | 73.2 | 205 |
| 891 | 79.5 | 11.5 | 3.0 | 3.0 | 3.0Ge | 240 | | | 26,400 | 257,000 | 3,160 | 0.0115 | 29.63 | 7,700 | 69.6 | 178 |
| 897 | 79.7 | 13.3 | 2.5 | 2.7 | 1.8 1.0Sb | 400 | | | 18,300 | 172,000 | 3,020 | 0.0154 | 33.51 | 6,540 | 72.3 | 215 |
| 892 | 78.5 | 11.4 | 3.0 | 2.9 | 4.2Co | 240 | 450 | 20 | 16,900 | 152,300 | 3,760 | 0.0136 | 41.53 | 8,960 | 65.7 | 175 |
| 896 | 78.8 | 12.4 | 2.4 | 2.7 | 3.0 0.7Si | 240 | 400 | 5 | 15,500 | 126,000 | 3,550 | 0.0165 | 46.47 | 8,240 | 68.9 | 235 |
| 903 | 79.0 | 10.4 | 3.0 | 3.1 | 4.5Cu | 240 | | | 18,300 | 178,000 | 3,640 | 0.0142 | 45.51 | 7,200 | 63.4 | 180 |

As understood from the above examples and Table 9, the maximum values of the initial permeability and the maximum permeability of the alloy according to the present invention, which is prepared by adding the amount of subingredient of less than 10 percent by weight in total selected from the group consisting of Mo, Cr, W, V, Mn, Ge, Ti, Zr, Al, Si, Sn, Sb, Co and Cu to the Ni-Fe-Nb-Ta alloy, are very large, and the initial permeability and the maximum permeability of the alloy (alloy No. 820 in Table 9) consisting of 79.5 percent of Ni, 11.5 percent of Fe, 2.9 percent of Nb, 3.0 percent of Ta and 3.1 percent of Mo, which is heated at a temperature of 1,150°C for 2 hours, cooled to 600°C in the furnace, maintained at the same temperature for 10 minutes, then cooled to a room temperature at a speed of 100°C/hour, are 62,800 and 337,000, respectively, and the Vickers hardness Hv is 178. These characteristics are larger than the initial permeability of 8,000, the maximum permeability of 100,000 and the hardness Hv of 128 of the alloy consisting of 78.5 percent of Ni and 21.5 percent of Fe, which is heated at a temperature of 1,050°C, cooled to 600°C in the furnace, and cooled to a room temperature at a high speed.

As described above, it is preferable to carry out the first heat treatment in a non-oxidizing atmosphere or in vacuum at a temperature of more than 800°C, preferably more than 1,100°C and less than the melting point, for at least more than 1 minute and less than about 100 hours corresponding to the composition, then cooled to about 600°C in the furnace, and cooled at a suitable speed of 100°C/second to 1°C/hour, preferably 10°C/second to 10°C/hour, corresponding to the composition.

Further, in case of carrying out the second heat treatment following to the first heat treatment, it is preferable to heat the alloy at a temperature of less than the order-disorder transformation point, i.e., less than about 600°C in a non-oxidizing atmosphere or in vacuum for more than 1 minute to less than about 100 hours and thereafter slowly cooled.

In general, from the viewpoint of construction, the magnetic recorder and reproducer has some defects such as wear of the head and change of the tone quality, since the magnetic tape closely passes on the magnetic head. Therefore, it is desirable to use the alloy having high hardness and rich anti-abrasion. The Ni-Fe alloy commonly used as a head has small Vickers hardness Hv of about 130 and is easily abrade. However, the alloy according to the present invention has high hardness as seen from Table 8; namely, in case of adding the amount of subingredients of 0.01-10 percent by weight in total selected from the group consisting of Mo, Cr, W, V, Ta, Mn, Ge, Ti, Zr, Al, Si, Sn, Sb, Co and Cu to the Ni-Fe-Nb alloy, the Vickers hardness Hv becomes 152-359 and the anti-abrasion property was remarkably improved. This high hardness is the most available characteristic feature of the alloy according to the present invention.

As the magnetic recording and reproducing head is used in the AC magnetic field, large electric resistance is preferable for making eddy current loss small. As compared with the Ni-Fe (79-21 percent) alloy having the specific electric resistance of 16 $\mu\Omega$-cm, the alloy according to the present invention has the large specific electric resistance such as 63-103 $\mu\Omega$-cm, as understood from examples and Tables 8 and 9. This large specific electric resistance is also one of the available characteristic features of the present invention.

Further, the magnetic alloy used for the magnetic head is rolled to a thin sheet, punched into an article having a suitable configuration, and laminated, such thin sheets with each other, so that good workability is required. The alloy of the present invention is easily worked such as forging, rolling, drawing, swaging, punching, etc., as well as the case of the Ni-Fe alloy.

Further, as the alloy of the present invention has high hardness, it is most available as a magnetic recording and reproducing head material, and with its excellent magnetic property and large electric resistance, the alloy of the present invention is also usable as a magnetic material for common electric apparatuses and devices.

Next, in the present invention, the reason why the composition of the alloy is limited to 70-85.9 percent of Ni, 5-28 percent of Fe and 1-14 percent of Nb and further limited the elements to be added thereto to 0-8 percent of Mo, 0-7 percent of Cr, 0-10 percent of W, 0-7 percent of V, 0-10 percent of Ta, 0-10 percent of Mn, 0-7 percent of Ge, 0-7 percent of Ti, 0-5 percent of Zr, 0–5 percent of Al, 0–5 percent of Si, 0–5 percent of Sn, 0–5 percent of Sb, 0–10 percent of Co and 0–10 percent of Cu is due to the fact that the permeability and hardness within the range of the composition are quite high and the workability is quite better, but their values become quite low and the processing becomes very difficult so as to be improper to use as a material for the magnetic recording and reproducing head when the composition deviates from said range.

The limiting range of the compositions of each element of the alloy according to the present invention will be explained in detail as follows.

1. Ni = 70–85.9 percent

In the range of 70–85.9 percent of Ni, the initial permeability $\mu_o$ and the maximum permeability $\mu_m$ show the maximum values of 109,300 and 461,000, respectively, and the excellent magnetic property is obtained, but in the range of less than 70 percent of Ni, the initial permeability $\mu_o$ and the maximum permeability $\mu_m$ become less than 3,000 and less than 5,000, respectively, with the decrease of the nickel amount. Further, in the range of more than 85.9 percent of Ni, the maximum permeability $\mu_m$ is comparatively large but the initial permeability $\mu_o$ becomes less than 3,000. Accordingly, the range of the nickel content is defined to 70–85.9 percent. The preferable range of the nickel content is 70–84.8 percent, especially 75–83 percent.

2. Fe = 5–28 percent

In the range of 5–28 percent of Fe, the excellent magnetic property is obtained, but in the range of less than 5 percent of Fe, the initial permeability $\mu_o$ and the maximum permeability $\mu_m$ become less than 3,000 and less than 5,000, respectively. Further, in the range of more than 28 percent of Fe, the initial permeability $\mu_o$ and the maximum permeability $\mu_m$ become less than 3,000 and less than 5,000, respectively. Accordingly, the range of Fe content is defined to 5–28 percent. The preferable range of the iron content is about 5–25.5 percent, especially 8–23 percent.

3. Nb = 1–14 percent

If the amount of Nb content is within said range, its excellent magnetic property and high hardness are obtained, but in the range of less than 1 percent of Nb, the Vickers hardness Hv becomes less than 150. Further, in the range of more than 14 percent of Nb, the initial permeability $\mu_o$ and the maximum permeability $\mu_m$ become less than 3,000 and less than 5,000, respectively, and further, the forging and rolling become difficult. Accordingly, the range of Nb content is defined to 1–14 percent.

Further, the preferable range of the niobium content is 3.1–14 percent, especially 6–10 percent.

4. Mo = 0–8 percent

In the range of 0–8 percent of Mo, the maximum values of the initial permeability $\mu_o$ and the maximum permeability $\mu_m$ are 109,300 and 461,000, respectively, and the excellent magnetic property is obtained, but in the range of more than 8 percent of Mo, the forgoing and rolling become difficult. Accordingly, the range of Mo content is defined to 0–8 percent.

Further, the preferable range of the molybdenum content is less than 7 percent, especially less than 4 percent.

5. Cr = 0–7 percent

In the range of 0–7 percent of Cr, the initial permeability $\mu_o$ shows the maximum value of 64,250 and is excellent, but in the range of less than 7 percent of Cr, the initial permeability $\mu_o$ and the maximum permeability $\mu_m$ become less than 3,000 and less than 5,000, respectively. Accordingly, the range of Cr content is defined to 0–7 percent.

The preferable range or chromium is less than 5 percent, especially less than 3 percent.

6. W = 0–10 percent

In the range of 0–10 percent of W, the initial permeability $\mu_o$ shows the maximum value of 81,200 and is excellent, but in the range of more than 10 percent of W, the initial permeability $\mu_o$ and the maximum permeability $\mu_m$ become less than 3,000 and less than 5,000, respectively, and the forging and rolling become difficult. Accordingly, the range of W content is defined to 0–10 percent.

The preferable range of tungsten is less than 5 percent.

7. V = 0–7 percent

In the range of 0–7 percent of V, the initial permeability $\mu_o$ shows the maximum value of 68,400 and its magnetic property is excellent and the hardness is increased, but in the range of more than 7 percent of V, the forging and rolling become difficult. Accordingly, the range of V content is defined to 0–7 percent. Further, the preferable range of vanadium is less than 4 percent.

8. Ta = 0–10 percent

In the range of 0–10 percent of Ta, the initial permeability $\mu_o$ shows the maximum value of 67,000 and an excellent magnetic property is obtained and the hardness is increased, but in the range of more than 10 percent of Ta, the forging and rolling become difficult. Accordingly, the range of Ta content is defined to 0–10 percent.

Further, the preferable range of tantalum is less than 7 percent.

9. Mn = 0–10 percent

In the range of 0–10 percent of Mn, the initial permeability $\mu_o$ shows the maximum value of 69,600 and its excellent magnetic property is obtained, but in the range of more than 10 percent, the initial permeability $\mu_o$ and the maximum permeability $\mu_m$ become less than 3,000 and less than 5,000, respectively. Accordingly, the range of Mn content is defined to 0–10 percent.

Further, the preferable range of manganese is less than 5 percent.

10. Ge = 0–7 percent

In the range of 0–7 percent of Ge, the initial permeability $\mu_o$ shows the maximum value of 73,200 and its magnetic property is excellent, but in the range of more than 7 percent of Ge, the initial permeability $\mu_o$ and the maximum permeability $\mu_m$ become less than 3,000 and less than 5,000, respectively. Accordingly, the range of Ge content is defined to 0–7 percent.

Further, the preferable range of the germanium content is less than 5 percent.

11. Ti = 0–7 percent

In the range of 0–7 percent of Ti, the excellent magnetic property is obtained and the hardness is increased, but in the range of more than 7 percent of Ti, the initial permeability $\mu_o$ and the maximum permeability $\mu_m$ become less than 3,000 and less than 5,000, respectively, and the properties of forging and rolling become difficult. Accordingly, the range of Ti content is defined to 0–7 percent. The preferable range of titanium content is less than 5 percent, especially less than 3 percent.

12. Zr = 0–5 percent forging

In the range of 0–5 percent of Zr, the excellent property is obtained and the hardness is increased, but in the range of more than 5 percent of Zr, the initial permeability $\mu_o$ and the maximum permeability $\mu_m$ become less than 3,000 and less than 5,000, respectively, and the properties of forging and rolling become difficult. Accordingly, the range of Zr content is defined to 0–5 percent.

The preferable range of zirconium content is less than 3 percent.

13. Al = 0–5 percent

In the range of 0–5 percent of Al, the excellent magnetic property is obtained and the hardness is increased, but in the range of more than 5 percent of Al, the initial permeability $\mu_o$ and the maximum permeability $\mu_m$ become less than 3,000 and less than 5,000 respectively, and the forging and rolling become difficult. Accordingly, the range of Al content is defined to 0–5 percent.

The preferable range of aluminum content is less than 3 percent.

14. Si = 0–5 percent

In the range of 0–5 percent of Si, the excellent magnetic property is obtained and the hardness is increased, but in the range of more than 5 percent of Si, the initial permeability $\mu_o$ and the maximum permeability $\mu_m$ become less than 3,000 and less than 5,000, respectively, and the forging and rolling become difficult. Accordingly, the range of Si content is defined to 0–5 percent.

The preferable range of silicon content is less than 3 percent.

15. Sn = 0–5 percent

In the range of 0–5 percent of Sn, the excellent magnetic property is obtained and the hardness is increased, but in the range of more than 5 percent of Sn, the forging and rolling become difficult. Accordingly, the range of Sn content is defined to 0–5 percent.

The preferable range of tin content is less than 3 percent.

16. Sb = 0–5 percent

In the range of 0–5 percent of Sb, the excellent magnetic property is obtained and the hardness is increased, but in the range of more than 5 percent of Sb, the forging and rolling become difficult. Accordingly, the range of Sb content is defined to 0–5 percent.

The preferable range of antimony content is less than 3 percent.

17. Co = 0–10 percent

In the range of 0–10 percent of Co, the excellent magnetic property is obtained, but in the range of more than 10 percent of Co, the initial permeability $\mu_o$ and the maximum permeability $\mu_m$ become less than 3,000 and less than 5,000, respectively. Accordingly, the range of Co content is defined to 0–10 percent.

The preferable range o cobalt content is less than 5 percent.

18. Cu = 0–10 percent

In the range of 0–10 percent of Cu, the excellent magnetic property is obtained, but the range of more than 10 percent of Cu, the initial permeability $\mu_o$ and the maximum permeability $\mu_m$ become less than 3,000 and less than 5,000 respectively. Accordingly, the range of Cu content is defined to 0–10 percent.

The preferable range of copper content is less than 5 percent. In short, when Mo, Cr, W, V, Ta, Mn, Ge, Co and Cu are added to the Ni-Fe-Nb alloy having the above range of the composition, the initial permeability is particularly increased, and when Ti, Al, Si, Zr, Sn and Sb are added thereto, the hardness is particularly improved.

Further, the reason why the subingredients of said (4) to (18) are defined to 0.01–10 percent in total is that if the total amount of the subingredients exceeds 10 percent, the magnetic property is deteriorated and the forging and rolling become difficult. Further, the reason why the lower range is limited to more than 0.01 percent is that no addition effect is exhibited with the content of less than 0.01 percent.

In summary, in the process for preparing the alloy according to the present invention, the alloy consists of 70–85.9 percent, preferably 70–84.8 percent, more preferably 75–83 percent of Ni, 5–28 percent, preferably 5–25.5 percent, more preferably 8–23 percent of Fe, 1–14 percent, preferably 3.1–14 percent, more preferably 6–10 percent of Nb and 0.01–10 percent in total of subingredients selected from the group consisting of 0–8 percent, preferably 0–7 percent, more preferably 0–4 percent of Mo, 0–7 percent, preferably 0–5 percent, more preferably 0–3 percent of Cr, 0–10 percent, preferably 0–5 percent of W, 0–7 percent, preferably 0–4 percent of V, 0–10 percent, preferably 0–7 percent of Ta, 0–10 percent, preferably 0–5 percent of Mn, 0–7 percent, preferably 0–5 percent of Ge, 0–7 percent, preferably 0–5 percent, more preferably o–3 percent of Ti, 0–5 percent, preferably 0–3 percent of Zr, 0–5 percent, preferably 0–3 percent of Al, 0–5 percent, preferably 0–3 percent of Si, 0–5 percent, preferably 0–3 percent of Sn, 0–5 percent, preferably 0–3 percent of Sb, 0–10 percent, preferably 0–5 percent of Co, and 0–10 percent, preferably 0–5 percent of Cu as a subingredient, and a small amount of impurity, and such a molten alloy is poured into a mold to form an ingot having a suitable shape, the thus produced ingot is manufactured into a suitable mold having a desired shape at a room temperature or a higher temperature by applying the forging, rolling, drawing, swaging, etc., and further the thus obtained shaped article is heated in hydrogen atmosphere or any other suitable non-oxidizing gas atmosphere or in vacuum at a high temperature such as more than 800° C, preferably more than 1,100°C and less than the melting point for more than 1 minute and less than about 100 hours, then cooled at a suitable speed such as 100°C/second to 1°C/hour, preferably 10°C/second to 10°C/hour corresponding to the composition of an alloy. According to the composition of the alloy, it is further heated at a temperature of about less than 600°C, i.e., less than the order-disorder transformation point for more than 1 minute and less than about 100 hours. Thus, the excellent magnetic property, such as the initial permeability of 109,300 and the maximum permeability of 461,000, can be obtained. Further, the alloy according to the present invention has a comparatively large electric resistance such as 63–103 and higher hardness such as 152–359, and the forging, rolling, drawing, swaging, etc., are easily carried out at a room temperature and a high temperature, so that the alloy according to the present invention is most available as a magnetic alloy for the magnetic recording and reproducing head.

What is claimed is:

1. A heat-treated magnet alloy useful for a magnetic recording and reproducing head having high initial permeability of more than 3,000 and maximum permeability of more than 5,000, Vickers hardness of more than 150, and the degree of order of 0.1–0.6, consisting of by weight 70 to 85.9 percent of Ni, 5 to 28 percent of Fe, 1 to 14 percent of Nb as main ingredients, and 0.01 to 10 percent of subingredients selected from the group consisting of by weight 0 to 8 percent of Mo, 0 to 7 percent of Cr, 0 to 10 percent of W, 0 to 7 percent of V, 0 to 10 percent of Ta, 0 to 10 percent of Mn, 0 to 7 percent of Ge, 0 to 7 percent of Ti, 0 to 5 percent of Zr, 0 to 5 percent of Al, 0 to 5 percent of Si, 0 to 5 percent of Sn, 0 to 5 percent of Sb, 0 to 10 percent of Co and 0 to 10 percent of Cu and a small amount of impurities.

2. A magnet alloy as defined in claim 1, wherein the titanium content is 0 to 0.5 percent by weight.

3. A magnet alloy as defined in claim 1, wherein the titanium content is 0.5 to 7 percent by weight.

4. A heat-treated magnet alloy useful for a magnetic recording and reproducing head having high initial permeability of more than 4,000 and maximum permeability of more than 7,000, Vickers hardness of more than 150, and the degree of order of 0.1–0.6, consisting of by weight 70 to 84.8 percent of Ni, 5 to 25.5 percent of Fe, 3.1 to 14 percent of Nb as main ingredients, and 0.01 to 10 percent of subingredients selected from the group consisting of by weight 0 to 7 percent of Mo, 0 to 5 percent of Cr, 0 to 10 percent of W, 0 to 7 percent of V, 0 to 10 percent of Ta, 0 to 10 percent of Mn, 0 to 7 percent of Ge, 0 to 5 percent of Ti, 0 to 5 percent of Zr, 0 to 5 percent of Al, 0 to 5 p percent of Si, 0 to 5 percent of Sn, 0 to 5 percent of Sb, 0 to 10 percent of Co and 0 to 10 percent of Cu and a small amount of impurities.

5. A magnet alloy as defined in claim 4, wherein the titanium content is 0 to 0.5 percent by weight.

6. A magnet alloy as defined in claim 4, wherein the titanium content is 0.5 to 5 percent by weight.

7. A heat-treated magnet alloy useful for a magnetic recording and reproducing head having high initial permeability of more than 5,000 and maximum permeability of more than 10,000, Vickers hardness of more than 160, and the degree of order 0.1–0.6, consisting of by weight 75 to 83 percent of Ni, 8 to 23 percent of Fe, 6 to 10 percent of Nb as main ingredients, and 0.01 to 10 percent of subingredients selected from the group consisting of by weight 0 to 4 percent of Mo, 0 to 3 percent of Cr, 0 to 5 percent of W, 0 to 4 percent of V, 0 to 7 percent of Ta, 0 to 5 percent of Mn, 0 to 5 percent of Ge, 0 to 3 percent of Ti, 0 to 3 percent of Zr, 0 to 3 percent of Al, 0 to 3 percent of Si, 0 to 3 percent of Sn, 0 to 3 percent of Sb, 0 to 5 percent of Co and 0 and 5 percent of Cu and a small amount of impurities.

8. A magnet alloy as defined in claim 7, wherein the titanium content is 0 to 0.5 percent by weight.

9. A magnet alloy as defined in claim 7, wherein the titanium content is 0.5 to 3 percent by weight.

10. A heat-treated magnet alloy useful for a magnetic recording and reproducing and head having high initial permeability of more than 10,000 and maximum permeability of more than 100,000, high Vickers hardness of more than 180 and the degree of order of 0.1–0.6, essentially consisting of by weight 70 to 85.9 percent of Ni, 5 to 15 percent of Fe and 5.1 to 10 percent of Nb as main ingredients and 0.01 to 10 percent of subingredients selected from the group consisting of less than 4 percent of Mo, less than 3 percent of Al, less than 3 percent of Si, less than 3 percent of Ti and a small amount of impurities.

11. A heat-treated magnet alloy useful for a magnetic recording and reproducing head having high initial permeability of more than 3,000 and maximum permeability of more than 5,000, high Vickers hardness of more than 150 and the degree of order of 0.1–0.6, essentially consisting of by weight 70 to 84.8 percent of Ni, 5 to 24.9 percent of Fe, 3.1 to 14 percent of Nb, 0.01 to 7 percent of Mo and a small amount of impurities.

* * * * *